United States Patent
Wolleb et al.

[11] Patent Number: 5,851,621
[45] Date of Patent: Dec. 22, 1998

[54] HIGH-CAPACITY STORAGE MEDIA

[75] Inventors: Heinz Wolleb, Marly; Beat Schmidhalter, Giffers; Jean-Luc Budry, Clarens, all of Switzerland

[73] Assignee: Ciba Specialty Chemicals Corporation, Tarrytown, N.Y.

[21] Appl. No.: 842,292

[22] Filed: Apr. 23, 1997

[30] Foreign Application Priority Data

May 3, 1996 [CH] Switzerland ............................. 1135/96

[51] Int. Cl.$^6$ .................................................. B32B 3/00
[52] U.S. Cl. ........................ 428/64.1; 428/64.4; 428/64.8; 428/64.9; 428/457; 428/913; 430/270.14; 430/270.16; 430/495.1; 430/945; 369/283; 369/288
[58] Field of Search .................................. 428/64.1, 64.2, 428/64.4, 64.8, 64.9, 457, 913; 430/270.14, 270.16, 495.1, 945; 369/283, 288

[56] References Cited

U.S. PATENT DOCUMENTS

| | | | |
|---|---|---|---|
| 4,258,118 | 3/1981 | Foley et al. ............................. | 430/221 |
| 4,304,834 | 12/1981 | Cournoyer et al. ..................... | 430/221 |
| 4,626,496 | 12/1986 | Sato ....................................... | 430/270 |
| 4,656,121 | 4/1987 | Sato et al. .............................. | 430/495 |
| 4,809,022 | 2/1989 | Wilkinson et al. ................... | 346/135.1 |
| 4,891,305 | 1/1990 | Oba et al. .............................. | 430/495 |
| 4,994,352 | 2/1991 | Strandjord et al. .................... | 430/495 |
| 5,145,963 | 9/1992 | Nagai ......................................... | 446/6 |
| 5,196,250 | 3/1993 | Abe et al. ................................. | 428/64 |
| 5,272,047 | 12/1993 | Kovacs et al. .......................... | 430/495 |
| 5,294,471 | 3/1994 | Evans et al. .............................. | 428/64 |
| 5,426,015 | 6/1995 | Chapman et al. ...................... | 430/275 |
| 5,441,844 | 8/1995 | Shimoda ................................ | 430/167 |

FOREIGN PATENT DOCUMENTS

| | | |
|---|---|---|
| 0174054 | 6/1989 | European Pat. Off. . |
| 0438225 | 7/1991 | European Pat. Off. . |
| 0649133 | 4/1995 | European Pat. Off. . |
| 0649880 | 4/1995 | European Pat. Off. . |
| 0649884 | 4/1995 | European Pat. Off. . |
| 0676751 | 10/1995 | European Pat. Off. . |
| 0351182 | 3/1991 | Japan . |
| 4167239 | 6/1992 | Japan . |
| 6040162 | 2/1994 | Japan . |
| 9534890 | 12/1995 | WIPO . |

OTHER PUBLICATIONS

Chem. Abst. 126:164328j.
Derwent Abst. 87–273863/39.
Derwent Abst. 94–089086/11 for JP 06040162–A.
Derwent Abst. 83–750725/35.
Derwent Abst. 89–012307/02.
Derwent Abst. 89–012308/02.
Derwent Abst. 92–246621/30 for JP04167239–A.

*Primary Examiner*—Elizabeth Evans
*Attorney, Agent, or Firm*—Kevin T. Mansfield

[57] ABSTRACT

The invention relates to an optical recording medium comprising a substrate, a reflecting layer and a recording layer, which recording layer consists essentially of a dye of the formula (I), $$\left[ (Z^{n+})_q \quad \begin{array}{c} R_6 \\ N \\ R_7 \end{array} \begin{array}{c} R_8 \\ \\ R_9 \end{array} \begin{array}{c} O \\ \\ R_{10} \end{array} \begin{array}{c} R_3 \\ \\ R_{10} \end{array} \begin{array}{c} R_1 \\ N^+ \\ R_2 \end{array} \begin{array}{c} R_4 \\ R_5 \end{array} \right]_o \quad (Y^{m-})_p \quad (I)$$

in which $R_1$ and $R_6$ are hydrogen or unsubstituted or substituted alkyl, alkenyl, alkynyl, aralkyl or aryl, $R_6$ and $R_7$ are unsubstituted or substituted alkyl, alkenyl, alkynyl, aralky or aryl, $R_3$, $R_4$, $R_8$ and $R_9$ are hydrogen, halogen, $OR_{17}$, $SR_{17}$, $NR_{18}R_{19}$, $NO_2$, alkyl, alkenyl or Alkynyl, $R_5$ and $R_{10}$ are hydrogen, halogen, $OR_{17}$, $SR_{17}$, $NO_2$, $NR_{18}R_{19}$ or unsubstituted or substituted alkyl, alkenyl, alkynyl or aralkyl, and $R_{11}$ is hydrogen, $(CH_2)_{1-10}COO^-$, $(CH_2)_{1-10}COOR_{24}$, alkyl, alkenyl, alkynyl or unsubstituted or substituted aralkyl or aryl;

Y is the anion of an inorganic, organic or organometallic acid,

Z is a metal cation, ammonium cation or phosphonium cation, m, n and o are from 1 to 3, and p and q are from 0 to 4;

and the stoichiometry of o, p and q is such as not to result in any excess positive or negative charge in the formula (I).

The substituents can, if desired, be connected to one another in such a way, via a direct bond or via a bridge —O— or —NR$_{12}$—, as to form additional five- or six-membered rings.

The novel recording media are of high sensitivity and have good reproduction characteristics.

23 Claims, No Drawings

HIGH-CAPACITY STORAGE MEDIA

The field of the invention is the optical storage of information on write-once storage media, where the bits of information are differentiated by the different optical properties of a colorant at written and unwritten sites. This technology is referred to commonly as WORM (for example CD-R or DVD-R); these abbreviations have been adopted here as well.

Compact discs which can be written at a wavelength of from 770 to 830 nm are known from "Optical Data Storage 1989", Technical Digest Series, Vol.1, 45 (1989). They are read at a reduced readout rate. According to the Orange Book standard, the medium must have a base reflectivity of 65% or more at the recording wavelength. Examples of recording media that can be used are cyanine dyes (JP 58/125 246), phthalocyanines (EP 676 751, EP 712 904), azo dyes (U.S. Pat. No. 5,441,844), double salts (U.S. Pat. No. 4,626,496), dithioethene metal complexes (JP Kokai 63/288 785, JP Kokai 63/288 786), azo metal complexes (U.S. Pat. No. 5,272,047, U.S. Pat. No. 5,294,471, EP 649 133, EP 649 880) or mixtures thereof (EP 649 884).

As a result of the use of more recent compact powerful red diode lasers which emit in the range from 630 to 690 nm, it is possible in principle to improve the data packing density from 5 to 8 times, since the track spacing (distance between 2 turns of the information track) and the size of the bits can be reduced, for instance, to about half those of a conventional CD.

However, this places extremely stringent requirements on the recording layer to be used, such as high refractive index, uniformity of written width at different pulse durations, and high daylight stability coupled with high sensitivity to high-energy laser radiation. The known recording layers possess these properties only to an unsatisfactory extent.

Thus EP 676 751 describes an optical recording medium which can be recorded on and read both at 770 to 830 nm and at 630 to 690 nm. In the range from 630 to 690 nm, however, the base reflectivity of this recording medium is very low, so that recording must therefore be carried out preferentially in the range from 770 to 830 nm, where it is nevertheless known that the higher storage density desired cannot be achieved. Another problem is the practical necessity of using dye mixtures, which often goes hand in hand with the occurrence of unwanted interactions.

Alternatively, JP 06/40162 describes an optical recording medium which comprises a trimethinecyanine dye and can be recorded on at 630 nm. This recording medium is, however, unable to satisfy the stringent requirements in respect, in particular, of sensitivity to red laser radiation and daylight stability.

JP-3/51 182 describes optical recording media which comprise a cyanine dye cation and an electrophilic azo metal complex anion and are said to possess enhanced light stability. Phenol-azo-naphthol chromium complexes are disclosed as the azo metal complex anions. These optical recording media, however, have a very broad absorption and flat absorption edge in the region from 600 to 900 nm.

U.S. Pat. No. 5,426,015 discloses a deep blue salt of a cyanine dye cation and a bisazopyridonenickel anion, which likewise features broad-band absorption. Writing and reading are done at 788 nm, so that it is again impossible with this system to obtain any high storage capacity.

EP-438 225 describes conventional optical discs containing fluorescent dyes, including rhodamine. These media can be read with a laser beam at 780 nm but cannot be written optically by any means.

The aim of the invention was to provide an optical recording medium whose recording layer possesses high storage capacity coupled with outstanding properties otherwise. This recording medium should be both writeable and readable at the same wavelength in the region from 600 to 700 nm. Principal features of the novel recording layer are the very high initial reflectivity in the abovementioned wavelength region of the laser diodes, which reflectivity can be altered with high sensitivity, the high refractive index, the narrow absorption band in the solid state, the good uniformity of the written width at different pulse durations, and the good light stability and good solubility in polar solvents.

The use of specific xanthene dyes as recording layer has very surprisingly made it possible to provide an optical recording medium whose properties are astonishingly better than those of recording media known to date.

The invention accordingly provides an optical recording medium comprising a substrate, a reflecting layer and a recording layer, wherein this recording layer consists essentially of one or more dyes of the formula (I)

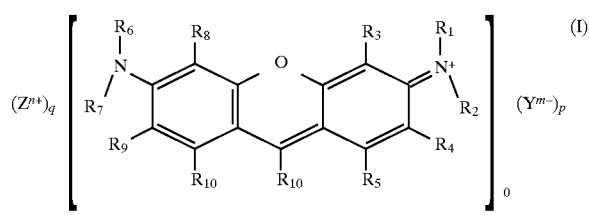

in which $R_1$, $R_2$, $R_6$ and $R_7$ independently of one another are hydrogen, unsubstituted or mono- or poly-halo-, —$C_1$–$C_8$alkoxy-, —$C_1$–$C_8$alkylthio-, —$NO_2$—, —CN—, —$NR_{12}R_{13}$—, —COO$^-$—, —COOH, —COO—$C_1$–$C_8$alkyl-, —$SO_3^-$—, —$SO_3$H—or —$SO_3$—$C_1$–$C_8$alkyl-substituted $C_1$–$C_{20}$alkyl, $C_2$–$C_{20}$alkenyl or $C_2$–$C_{20}$alkynyl, or unsubstituted or mono- or poly-$C_1$–$C_8$alkyl-, —$C_1$–$C_8$alkoxy-, —$C_1$–$C_8$alkylthio-, -halo-, —$NO_2$—, —CN—, —$NR_{12}R_{13}$—, —$SO_3^-$—, —$SO_3R_{12}$—, —$SO_2NR_{12}R_{13}$—, —COO$^-$—, —$COOR_{12}$—, —$CONR_{12}R_{13}$—, —$PO_3^-$,—$PO(OR_{12})(OR_{13})$— or —$SiR_{14}R_{15}R_{16}$-substituted $C_7$–$C_{18}$aralkyl or $C_6$–$C_{14}$aryl, but $R_1$ and $R_6$ and $R_2$ and $R_7$ are not each both simultaneously hydrogen, and where $R_1$ and $R_2$ and $R_6$ and $R_7$ independently of one another, each in pairs, are separate or, if they contain substitutable sites, can be connected to one another in such a way, via a direct bond or via a bridge —O— or —$NR_{12}$—, as to form with the shared $N^+$ a five- or six-membered heterocycle;

$R_3$, $R_4$, $R_5$, $R_8$, $R_9$ and $R_{10}$ independently of one another are hydrogen, halogen, $OR_{17}$, $SR_{17}$, $NO_2$, $NR_{18}R_{19}$ or unsubstituted or mono- or poly-halo-, —$C_1$–$C_8$alkoxy-, —$C_1$–$C_8$alkylthio-, —$NO_2$—, —CN— or —$NR_{18}R_{19}$-substituted $C_1$–$C_{20}$alkyl, $C_2$–$C_{20}$alkenyl, $C_2$–$C_{20}$alkynyl or $C_7$–$C_{18}$aralkyl, $R_1$ and $R_3$, $R_2$ and $R_4$, $R_6$ and $R_8$ and $R_7$ and $R_9$ independently of one another, each in pairs, are separate or, if both in each case contain at least one substitutable site, are connected to one another in such a way, via a direct bond or via a bridge —O— or —$NR_{20}$—, as to form a five- or six-membered heterocycle with the shared group C—C=$N^+$, C=C—N or C—C—N, or $R_4$ and $R_5$ or independently thereof, $R_9$ and $R_{10}$ together are 1,4-buta-1,3-dienylene which is unsubstituted or is substituted one or more times by $C_1$–$C_8$alkyl, $C_1$–$C_8$alkoxy, $C_1$–$C_8$alkylthio, halogen, $NO_2$, CN, $NR_{18}R_{19}$, $SO_3^-$, $SO_3R_{17}$, $SO_2NR_{18}R_{19}$, COOR$^-$, $COOR_{17}$, $CONR_{18}R_{19}$, $PO_3^-$, $PO(OR_{18})(OR_{19})$ or $SiR_{21}R_{22}R_{23}$, so that alone or together with the shared C=C group a six-membered aromatic ring is formed;

$R_{11}$ is hydrogen, $(CH_2)_kCOO^-$, $(CH_2)_kCOOR_{24}$, $C_1-C_{20}$alkyl, $C_2-C_{20}$alkenyl, $C_2-C_{20}$alkynyl or $C_6-C_{14}$aryl or $C_7-C_{18}$aralkyl which is unsubstituted or substituted one or more times by halogen, $NO_2$, CN, $NR_{24}R_{25}$, $SO_3^-$, $SO_3R_{24}$, $SO_2NR_{24}R_{25}$, $COO^-$, $(CH_2)_k OR_{24}$, $(CH_2)_kOCOR_{24}$, $COOR_{24}$, $CONR_{24}R_{25}$, $OR_{24}$, $SR_{24}$, $PO_3^-$, $PO(OR_{24})(OR_{25})$ or $SiR_{21}R_{22}R_{23}$;

$R_{12}$, $R_{13}$, $R_{17}$, $R_{18}$, $R_{19}$, $R_{20}$, $R_{24}$ and $R_{25}$ independently of one another are hydrogen, $C_1-C_{20}$alkyl, $C_2-C_{20}$alkenyl, $C_2-C_{20}$alkynyl or $C_7-C_{18}$aralkyl, or are $C_6-C_{14}$aryl which is unsubstituted or substituted one or more times by $C_1-C_8$alkyl, $C_1-C_8$alkoxy, $C_1-C_8$alkylthio, halogen, $NO_2$, CN, $NH_2$, $NHR_{21}$, $NR_{21}R_{22}$, $SO_3^-$, $SO_3R_{23}$, $SO_2NH_2$, $SO_2NHR_{21}$, $SO_2NR_{21}R_{22}$, $COO^-$, $COOR_{23}$, $CONH_2$, $CONHR_{21}$, $CONR_{21}R_{22}$, $PO_3^-$, $PO(OR_{21})(OR_{22})$ or $SiR_{14}R_{15}R_{16}$, or $NR_{12}R_{13}$, $NR_{18}R_{19}$, $NR_{21}R_{22}$ or $NR_{24}R_{25}$ is a five- or six-membered heterocycle which possibly contains an additional N or O atom and which can be substituted one or more times by $C_1-C_8$alkyl;

$R_{14}$, $R_{15}$, $R_{16}$, $R_{21}$, $R_{22}$ and $R_{23}$ independently of one another are $C_1-C_{20}$alkyl, $C_2-C_{20}$alkenyl, $C_2-C_{20}$alkynyl or $C_7-C_{18}$aralkyl;

Y is an inorganic, organic or organometallic anion, or a mixture thereof;

Z is a proton or a metal cation, ammonium cation or phosphonium cation, or a mixture thereof;

k is an integer from 1 to 10;

m, n and o independently of one another are each an integer from 1 to 3; and p and q are each an integer from 0 to 4, where the relationship between o, p and q, depending on the charge of the associated substructures, is such that there is no excess positive or negative charge in formula (I).

Where the numbers p and q are not integers, formula (I) is to be interpreted as meaning a mixture of defined molar composition, whose individual components can, if desired, also be different in stoichiometry.

Examples of anions of inorganic or organic acids are fluoride, chloride, bromide, iodide, perchlorate, periodate, carbonate, hydrogen carbonate, sulfate, hydrogen sulfate, phosphate, hydrogen phosphate, dihydrogen phosphate, tetrafluoroborate, hexafluoroantimonate, acetate, oxalate, methanesulfonate, trifluoromethanesulfonate, tosylate, methyl sulfate, phenolate, benzoate or a negatively charged metal complex.

Examples of metal cations, ammonium cations and phosphonium cations are $Li^+$, $Na^+$, $K^+$, $Mg^{2+}$, $Ca^{2+}$, $Cu^{2+}$, $Ni^{2+}$, $Fe^{2+}$, $Co^{2+}$, $Zn^{2+}$, $Sn^{2+}$, $La^{3+}$, methylammonium, ethylammonium, pentadecylammonium, isopropylammonium, dicyclohexylammonium, tetramethylammonium, tetraethylammonium, tetrabutylammonium, benzyltrimethylammonium, benzyltriethylammonium, methyltrioctylammonium, tridodecylmethylammonium, tetrabutylphosphonium tetraphenylphosphonium, butyltriphenylphosphonium or ethyltriphenylphosphonium.

Alkyl, alkenyl or alkynyl, for example $C_1-C_{20}$alkyl, $C_2-C_{20}$alkenyl or $C_2-C_{20}$alkynyl, can be straight-chain, branched, monocyclic or polycyclic. $C_1-C_{20}$alkyl is therefore, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, n-hexyl, cyclohexyl, n-octyl, 1,1,3,3-tetra-methylbutyl, 2-ethylhexyl, nonyl, trimethylcyclohexyl, decyl, menthyl, thujyl, bornyl, 1-adamantyl, 2-adamantyl, dodecyl, tetradecyl, hexadecyl, octadecyl or eicosyl. $C_1-C_{24}$alkyl, furthermore, can also be heneicosyl, docosyl or tetracosyl, for example.

$C_2-C_{20}$alkenyl is $C_2-C_{20}$alkyl which is mono- or polyunsaturated, in which context two or more double bonds can, if desired, be in isolation or conjugation, examples being vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-pmenthen-8-yl, 4(10)-thujen-10-yl, 2-norbornen-1-yl, 2,5-norbomadien-1-yl, 7,7-dimethyl-2,4-norcaradien-3-yl or the various isomers of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

$C_2-C_{20}$alkynyl is $C_2-C_{20}$alkyl or $C_2-C_{20}$alkenyl containing one or more instances of double unsaturation, it being possible for the triple bonds to be in isolation or in conjugation with each other or with double bonds, examples being 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadin-5-yl, 1-octyn-8-yl, 1-nonyn-9-yl, 1-decyn-10-yl or 1-tetracosyn-24-yl.

$C_7-C_{18}$aralkyl is for example benzyl, 2-benzyl-2-propyl, β-phenylethyl, 9-fluorenyl, α,α-dimethylbenzyl, ω-phenylbutyl, ω-phenyloctyl, ω-phenyldodecyl or 3-methyl-5-(1', 1', 3',3'-tetramethylbutyl)benzyl. In addition, $C_7-C_{24}$aralkyl can also, for example, be 2,4,6-tri-tert-butylbenzyl or 1-(3,5-dibenzylphenyl)-3-methyl-2-propyl. If $C_7-C_{1s}$aralkyl is substituted, then both the alkyl moiety and the aryl moiety or the aralkyl group can be substituted, the latter alternative being preferred.

$C_6-C_{14}$aryl is, for example, phenyl, naphthyl, biphenylyl, 2-fluorenyl, phenanthryl, anthracenyl or terphenylyl.

$C_1-C_8$alkoxy is $O-C_1-C_{18}$alkyl, and $C_1-C_8$alkylthio is $S-C_1-C_{18}$alkyl.

Halogen (halo-) is chlorine, bromine, fluorine or iodine, preferably chlorine or bromine.

The novel recording medium can in addition to the compound of the formula (I) include other salts, for example ammonium chloride, pentadecylammonium chloride, sodium chloride, sodium sulfate, sodium methylsulfonate or sodium methylsulfate, whose ions can be derived, for example, from the components used. If present, the additional salts are preferably in amounts of up to 20% by weight based on the total weight of the recording layer.

Preference is given to compounds of the formula (I) in which $R_1$, $R_2$, $R_6$ and $R_7$ independently of one another are hydrogen or are unsubstituted or mono- or poly-$COO^-$—, —COOH—, —COO—$C_1-C_8$alkyl-, —$SO_3^-$—,—$SO_3$H— or —$SO_3$—$C_1-C_8$alkyl-substituted $C_1-C_{20}$alkyl, $C_2-C_{20}$alkenyl or $C_2-C_{20}$alkynyl, but $R_1$ and $R_6$ and $R_2$ and $R_7$ are not in each case both simultaneously hydrogen;

and $R_1$ and $R_2$ and $R_6$ and $R_7$ independently of one another, each, are in pairs separate or, if they contain substitutable sites, can be connected to one another in such a way, via a direct bond or via a bridge —O— or —$NR_{12}$—, as to form with the shared $N^+$ a five- or six-membered heterocycle;

$R_3$ and $R_8$ independently of one another are hydrogen, halogen, $OR_{17}$, $NO_2$, $C_1-C_{20}$alkyl, $C_2-C_{20}$alkenyl, $C_2-C_{20}$alkynyl or $C7-C_{18}$aralkyl;

$R_4$, $R_5$, $R_9$ and $R_{10}$ independently of one another are hydrogen, halogen, $NO_2$, $OR_{17}$ or unsubstituted $C_1-C_{20}$alkyl, $C_2-C_{20}$alkenyl, $C_2-C_{20}$alkynyl or $C_7-C_{18}$aralkyl;

and $R_1$ and $R_3$, $R_2$ and $R_4$, $R_6$ and $R_8$ and $R_7$ and $R_9$ independently of one another, each in pairs, are separate or, if both in each case contain at least one substitutable site, are connected to one another in such a way, via a direct bond, as to form a five- or six-membered heterocycle with the shared group C—C=N⁺, C=C—N or C—C—N;

$R_{11}$ is hydrogen, $(CH_2)_kCOO^-$ or $(CH_2)_kCOOR_{24}$ or is naphthyl or phenyl which is unsubstituted or substituted one or more times by halogen, $NO_2$, $NR_{24}R_{25}$, $SO_3^-$, $SO_3R_{24}$, $SO_2NR_{24}R_{25}$, $(CH_2)_kOR_{24}$, $COO^-$, $COOR_{24}$, $CONR_{24}R_{25}$ or $OR_{24}$;

$R_{17}$, $R_{19}$, $R_{24}$ and $R_{25}$ independently of one another are hydrogen or unsubstituted $C_1-C_{20}$alkyl, $C_2-C_{20}$alkenyl, $C_2-C_{20}$alkynyl or $C_7-C_{18}$aralkyl; and o is an integer 1 or 2; or $Y^{m-}$ is a transition metal complex anion containing at least one phenolic or phenylcarboxylic azo compound as ligand, m is an integer 1 or 2, and p is a number from 0 to 2; or Z is a proton or a metal cation or ammonium cation, n is an integer 1 or 2, and q is a number from 0 to 3;

and otherwise all abovementioned bridging possibilities, restrictions and definitions remain unchanged.

Particular preference is given to compounds of the formula (I) in which $R_1$, $R_2$, $R_6$ and $R_7$ independently of one another are unsubstituted $C_1-C_{20}$alkyl, $R_1$ and $R_2$ and $R_6$ and $R_7$ independently of one another, each in pairs, are separate, or can in such a way, be connected to one another, via a direct bond or via a bridge —O— or —$NR_{12}$—, as to form with the shared $N^+$ a five- or six-membered heterocycle;

$R_3$, $R_4$, $R_8$ and $R_9$ independently of one another are hydrogen or unsubstituted $C_1-C_{20}$alkyl, $R_1$ and $R_3$, $R_2$ and $R_4$, $R_6$ and $R_8$ and $R_7$ and $R_9$ independently of one another, each in pairs, are separate, or are connected to one another in such a way, via a direct bond, as to form a five- or six-membered heterocycle with the shared group C—C=N⁺, C=C—N or C—C—N;

$R_5$ and $R_{10}$ are hydrogen;

$R_{11}$ is naphthyl or phenyl which is unsubstituted or substituted one or more times by halogen, $NO_2$, $SO_3^-$, $SO_3R_{24}$, $SO_2NR_{24}R_{25}$, $COO^-$, $COOR_{24}$ or $CONR_{24}R_{25}$;

$R_{12}$ is hydrogen or unsubstituted $C_1-C_4$alkyl; and $R_{24}$ and $R_{25}$ independently of one another are hydrogen or unsubstituted $C_1-C_{20}$alkyl;

These preferences apply to each of the substructures present in formula (I), in each case independently of any other substructures present, provided that they meet the condition inherent in formula (I) that no excess positive or negative charge results. The phrase substructures of formula (I) refers to its three mutually unattached components $[xanthene]_o$, $(Y^{m-})_p$ and $(Z^{n+})_q$.

Particular preference, in particular on account of their high light fastness, is given to compounds of the formula (I) in which $Y^{m-}$ is a transition metal complex anion of the formula (II), $$[(L_1)M(L_2)]^{m-} \qquad (II)$$

in which $L_1$ and $L_2$ independently of one another are ligands of the formula

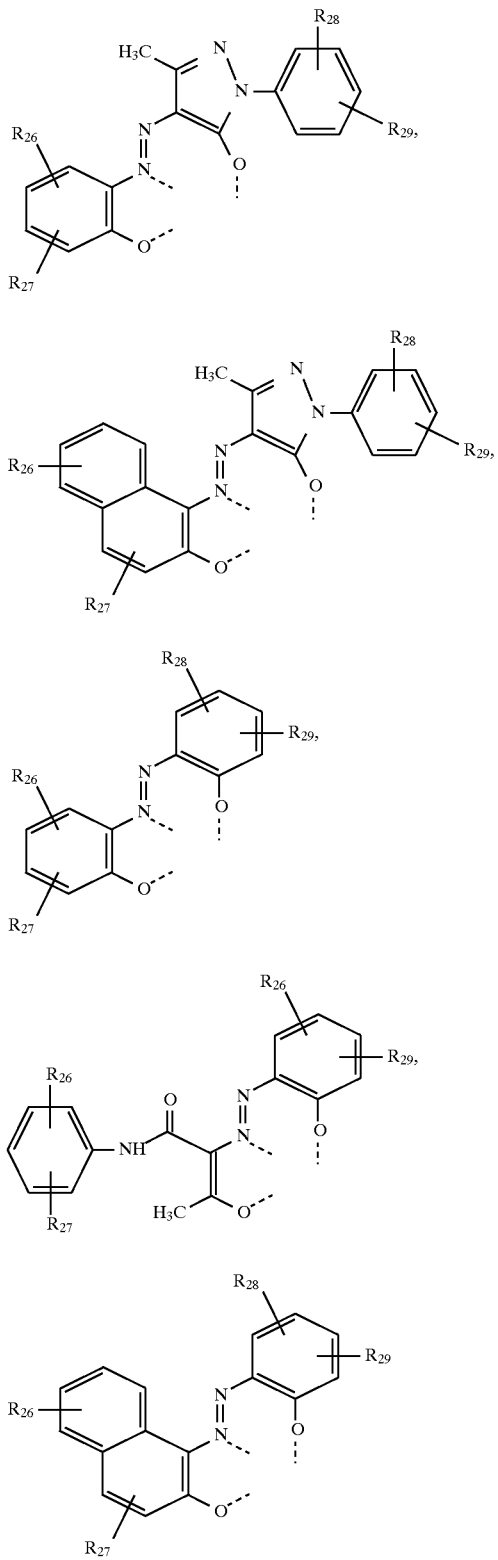

or

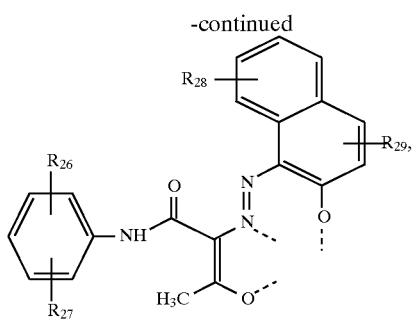

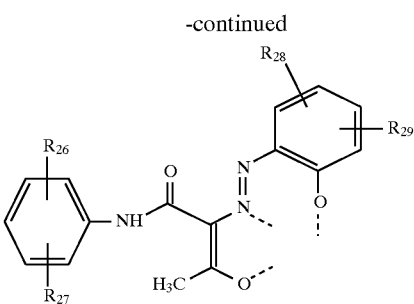

or in which $R_{26}$, $R_{27}$, $R_{28}$ and $R_{29}$ independently of one another are hydrogen, halogen, $R_{30}$, $NO_2$, $NR_{30}R_{31}$, $NHCO-R_{30}$, $NHCOO-R_{30}$, $SO_2-R_{30}$, $SO_2NH_2$, $SO_2NH-R_{30}$, $SO_2NR_{30}R_{31}$, $SO_3^-$ or $SO_3H$, where $R_{30}$ and $R_{31}$ independently of one another are unsubstituted or hydroxyl-, halo- or $C_1-C_6$alkoxy-substituted $C_1-C_{12}$alkyl; and M is $Cr^{3+}$ or $Co^{3+}$.

Among these compounds, very particular preference is given to compounds of the formula (I) in which $Y^{m-}$ is a transition metal complex anion of the formula (II) in which $L_1$ and $L_2$ independently of one another are ligands of the formula

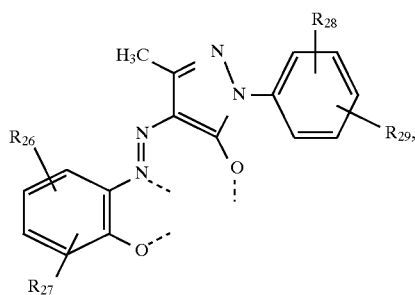

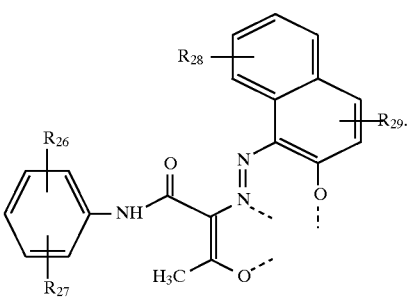

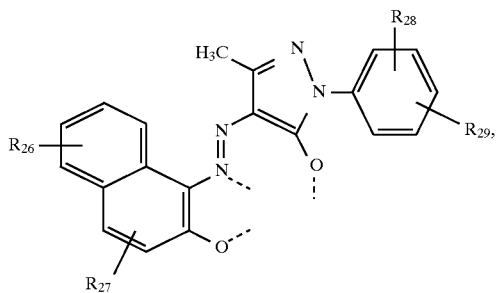

Particular preference is also given to compounds of the formula (I) in which $Z^{n+}$ is $[NH_2R_{32}R_{33}]^+$, where $R_{32}$ is hydrogen or $C_1-C_{12}$alkyl and $R_{33}$ $C_1-C_{24}$alkyl or $C_7-C_{24}$aralkyl, and $R_{32}$ and $R_{33}$ together have 8 to 25 carbon atoms.

Particular preference is also given in particular to compounds of the formula (I) in which m, n and o are each the number 1, p is a number from 0 to 2½, and q is a number from 0 to 1½, the sum of o and q being identical to p, so that in formula (II) no excess positive or negative charge results.

Very particular preference is given to the compounds of the formulae

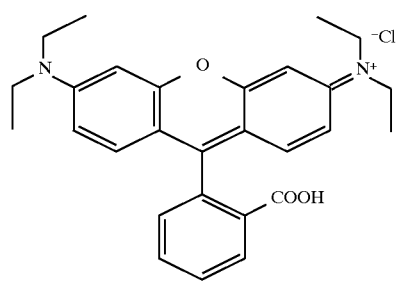

(rhodamine B),

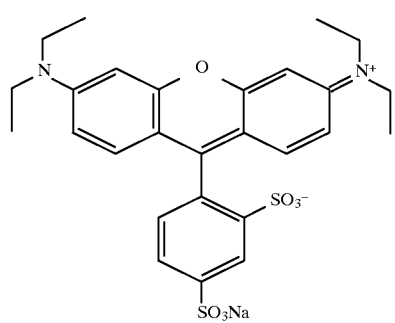
(sulforhodamine B monosodium salt),
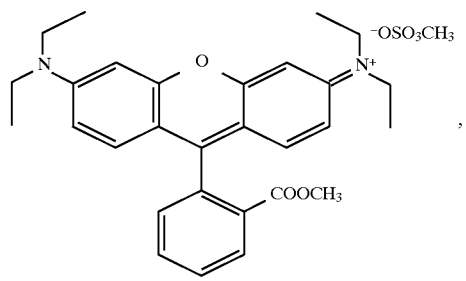
,
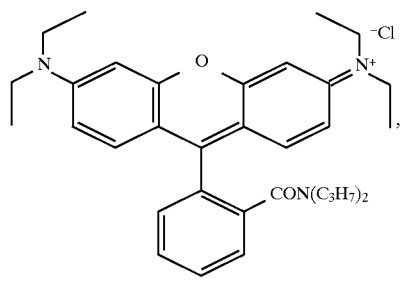
,
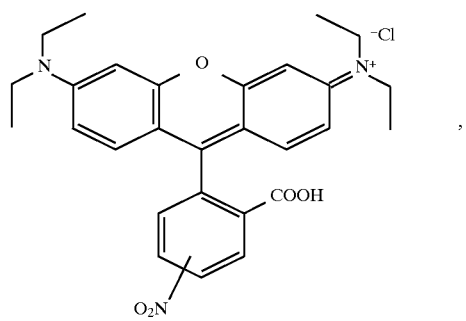
,
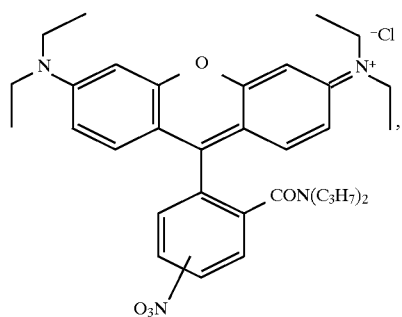
,
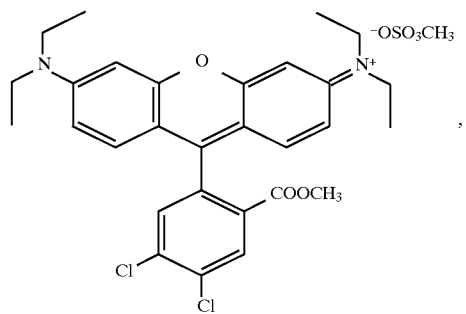
,
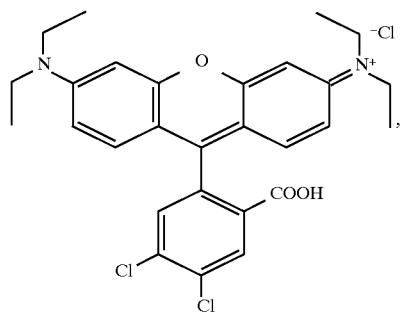
,
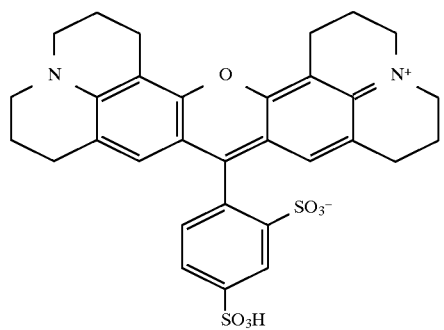
(sulforhodamine 101 free acid), 11
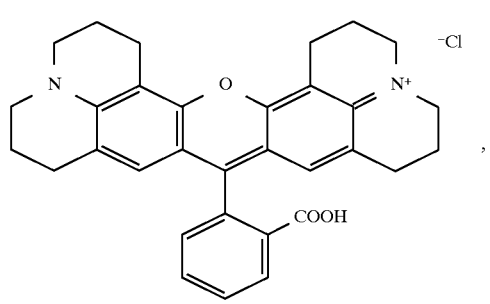
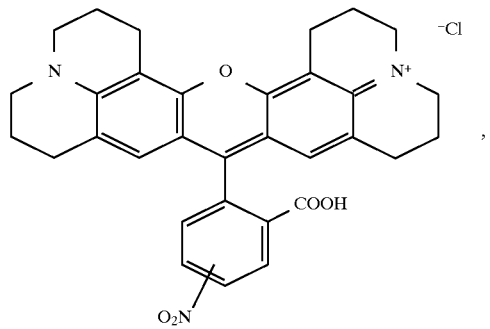
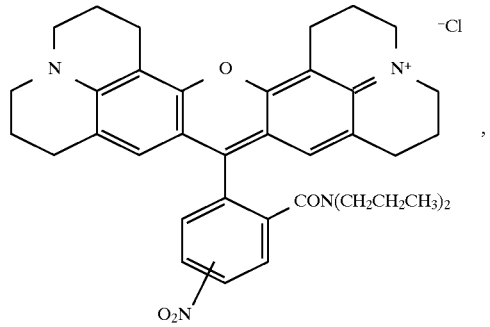
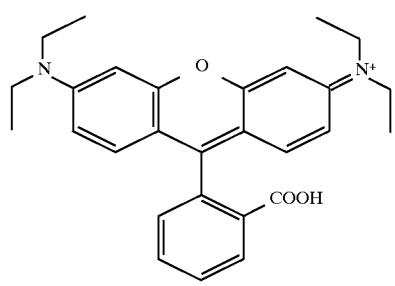
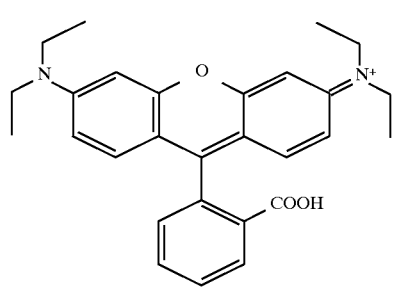
-continued
12
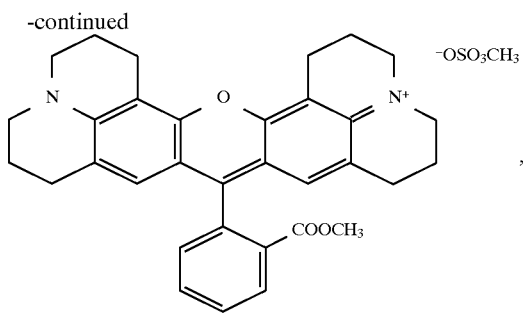
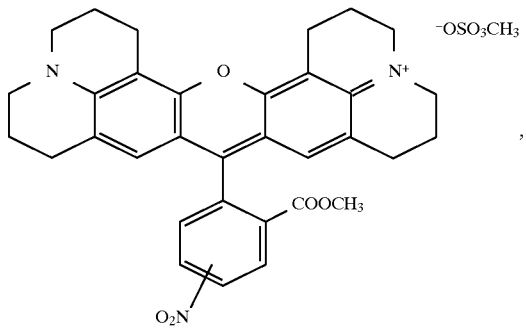
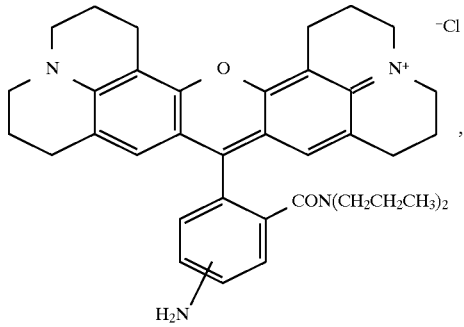
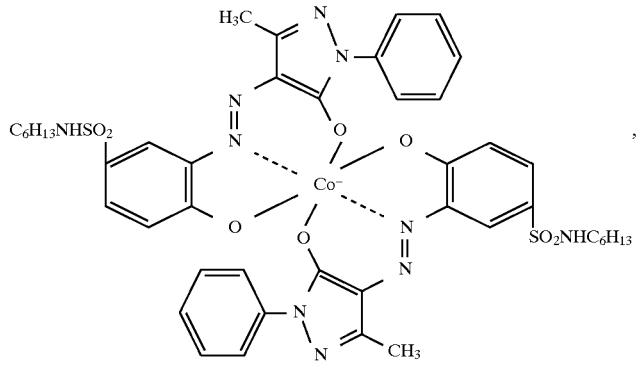
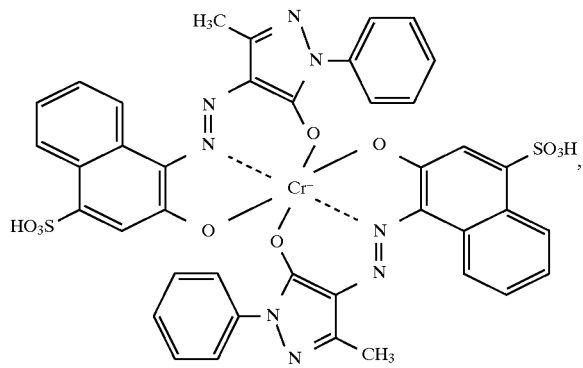

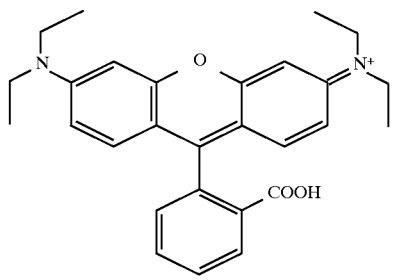
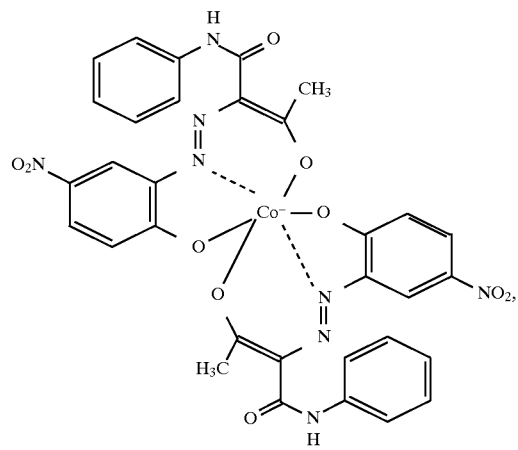
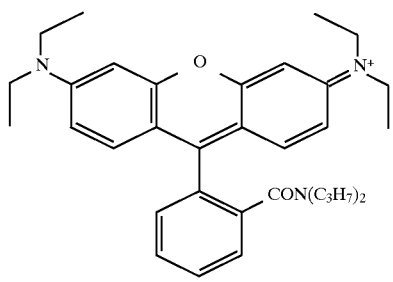
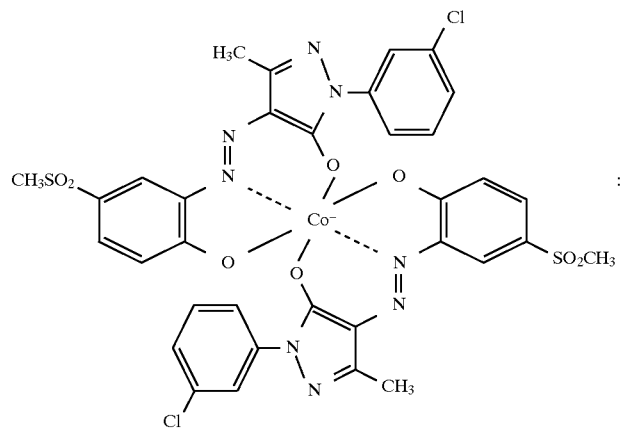
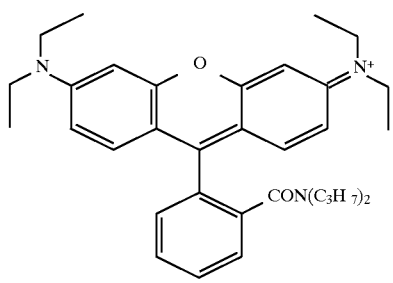
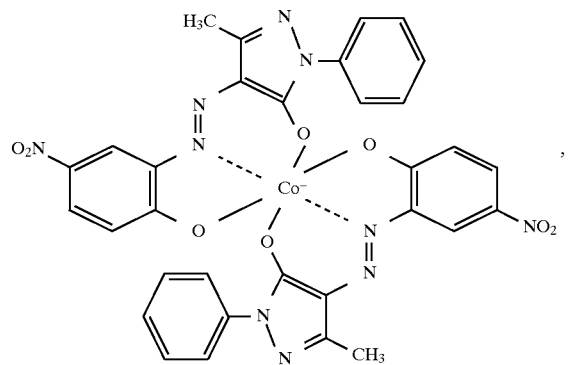

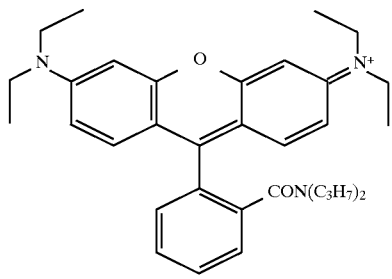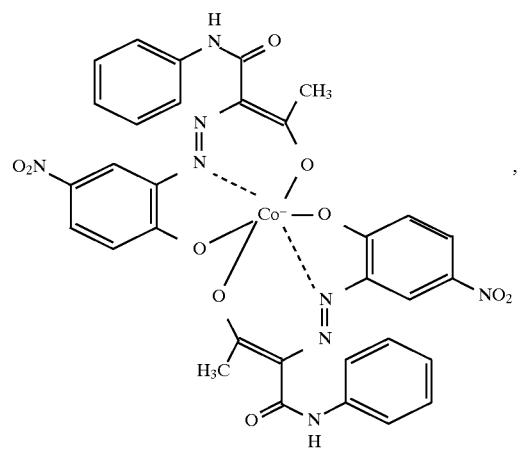
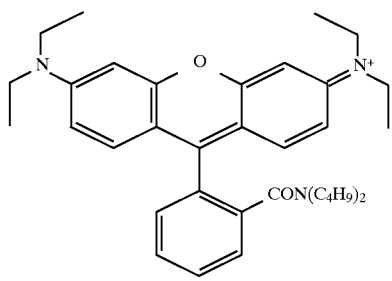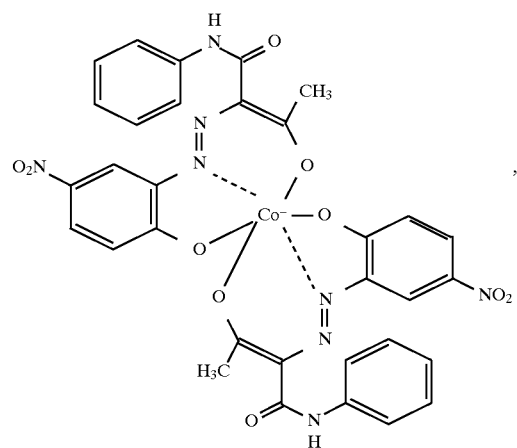
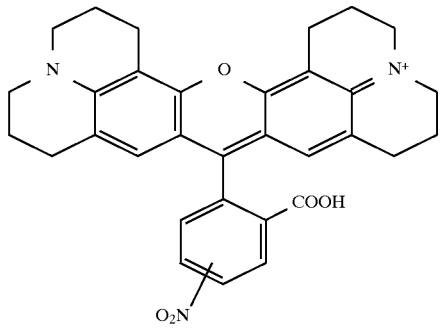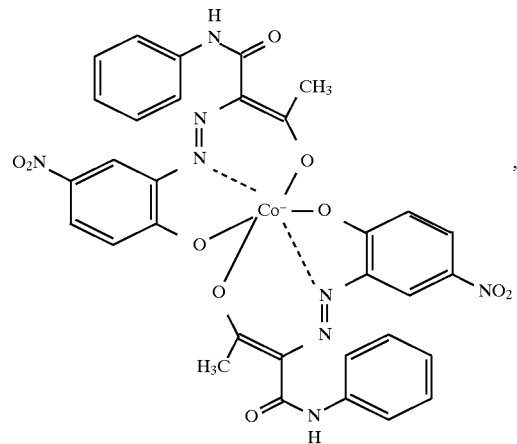

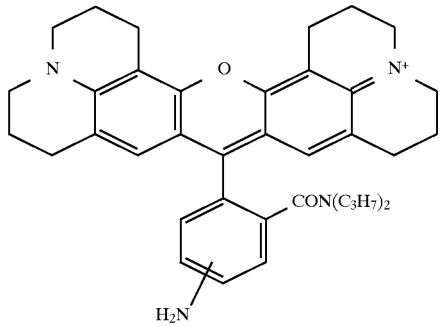

or

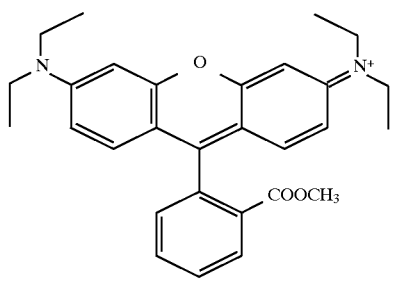

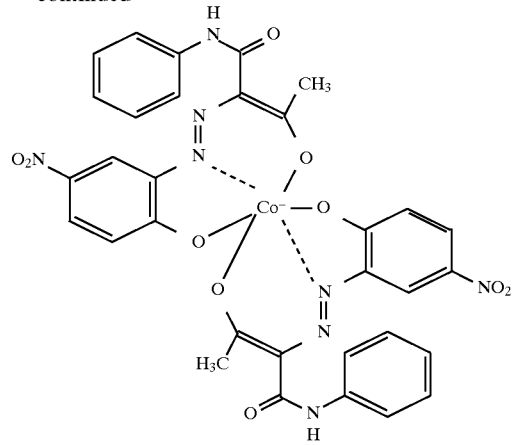

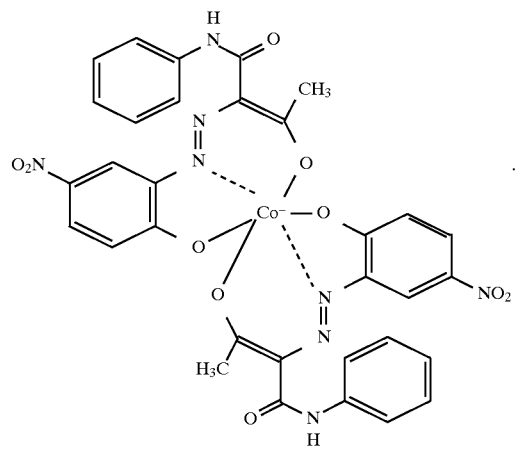

The compounds of the formulae (I) and (II) are known compounds which can be found, for example, in Ullmanns Encyklopädie der technischen Chemie 23, 381 ($4^{th}$ Edition 1983) or in the colour index 4, 4417 ($3^{rd}$ Edition 1971). Some of them are still novel, but they can be prepared in analogy to the known compounds by methods known per se, for example by those methods disclosed in EP 333 649 or EP 468 821. Metal complexes, preferably those of the formula (II), are well known from the technical literature. They may in particular be those metal complexes which are described in GB 1 599 812 or EP 450 421, the teaching of which is expressly incorporated herein by reference.

The xanthene dyes used in accordance with the invention when dissolved in ethanol have a narrow absorption band whose maximum is at from 540 to 610 nm and whose mid-peak width at a concentration of $10^{-5}$ mol/l is preferably not more than 60 nm. Very surprisingly they additionally possess a comparatively low tendency to agglomerate in the solid state, so that the absorption curve even in the solid state remains advantageously narrow.

The xanthene dyes used in accordance with the invention have, even on the longer-wave flank of the absorption band, a high refractive index which preferably reaches a peak value of from 2.0 to 3.0 in the range from 600 to 700 nm, leading thus to the possibility of a medium having high reflectivity and high sensitivity with good reproduction characteristics in the desired spectral region. Moreover, it is unnecessary to add a further dye to the recording layer, with the result that very good light fastness is obtained.

The substrate functioning as a support for the layers applied to it is judiciously semi-transparent (T≧10%) or preferably transparent (T≧90%). The support can have a thickness of from 0.01 to 10 mm, preferably from 0.1 to 5 mm.

The recording layer is preferably arranged between the transparent substrate and the reflecting layer. The thickness of the recording layer is from 10 to 1000 nm, preferably from 50 to 500 nm, particularly preferably about 100 nm, for example from 80 to 150 nm. The absorption of the recording layer is typically from 0.1 to 1.0 at the absorption maximum. With very particular preference, the layer thickness is chosen in a known manner, dependent on the respective refractive indices in the written and the unwritten state at the readout wavelength, so that there is constructive interference in the unwritten state and destructive interference in the written state, or vice versa.

The reflecting layer, whose thickness can be from 10 to 150 nm, preferably has a high reflectivity (R≧70%) coupled with a low transparency (T≦10%).

The layer which is topmost depending on the layer structure, for example the reflection layer or the recording layer, is judiciously provided in addition with a protective layer, which can have a thickness of from 0.1 to 1000 μm, preferably from 0.1 to 50 μm and, with particular preference, from 0.5 to 15 μm. This protective layer may, if desired, also serve as an adhesion promoter for a second substrate layer arranged thereon, which is preferably from 0.1 to 5 mm thick and consists of the same material as the support substrate.

The reflectivity of the total recording medium is preferably at least 60%.

The novel recording medium can neither be written nor read using the infrared laser diodes of the customary CD equipment in accordance with the requirements of the Orange Book standard, since at 780 nm, characteristically, the refractive indices (n) are between 1.4 and 1.9 and their imaginary components (k) are between 0 and 0.04 at most. This has the advantage of largely ruling out the danger of damage if there is an erroneous attempt to write in an instrument incapable of high resolution. The use of dyes of the formula (I) results in advantageously homogeneous, amorphous and low-scatter recording layers, and the refractive index edge is, surprisingly, particularly steep even in the solid phase. Further advantages are the high daylight stability coupled with high sensitivity under high-density laser radiation, the uniform written width, and the good thermal stability and storage stability.

Examples of suitable substrates are glasses, minerals, ceramics and thermosets or thermoplastics. Preferred supports are glasses and homo- or copolymeric plastics. Examples of suitable plastics are thermoplastic polycarbonates, polyamides, polyesters, polyacrylates and polymethacrylates, polyurethanes, polyolefins, polyvinyl chloride, polyvinylidene fluoride, polyimides, thermosetting polyesters and epoxy resins. The substrate can be in pure form or else can contain customary additives, for example UV absorbers or dyes, as is proposed, for example, in JP 04/167 239 as light protection for the recording layer. In the latter case it may be judicious for the dye added to the support substrate to have an absorption maximum which is hypsochromically shifted by at least 10 nm, preferably by at least 20 nm, relative to the dye of the recording layer.

The substrate is advantageously transparent in at least part of the range from 600 to 700 nm, so that it is permeable to at least 90% of the incident light of the writing or readout wavelength. On the side of the coating the substrate preferably has a spiral guide groove with a groove depth of from 50 to 500 nm, a groove width of from 0.2 to 0.8 $\mu$m and a spacing between 2 turns of from 0.4 to 1.6 $\mu$m, particularly preferably having a groove depth of 100 to 200 nm, a width of 0.3 $\mu$m and a distance between 2 turns of from 0.6 to 0.8 $\mu$m.

The recording layer can consist exclusively or essentially of one or more novel xanthene dyes. To increase the stability still further, however, it is also possible if desired to add known stabilizers in customary amounts, for example a nickel dithiolate described in JP 04/025 493 as light stabilizer. If desired, it is also possible to add additional dyes, although the amount of such dyes is judiciously not more than 50% by weight, preferably not more than 10% by weight, based on the recording layer. Since the recording layer is to consist essentially of a dye of the formula (I), it is advantageous for the optionally added dye to have a hypsochromically shifted absorption maximum relative to the dye of the formula (I), and for the amount of the added dye to be kept so small that the proportion of the latter in the overall absorption of the recording layer in the region from 600 to 700 nm is not more than 20%, preferably not more than 10%. With particular preference, however, no additional dye is added.

A particularly suitable reflective material for the reflection layer comprises metals which are good reflectors of the laser radiation used for recording and reproduction, examples being the metals of the third, fourth and fifth main groups and subgroups of the Periodic Table of the chemical elements. Particularly suitable metals are Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt and the lanthanide metals Ce, Pr, Nd, Pm, Sm, Eu, Gd, Tb, Dy, Ho, Er, Tm, Yb and Lu, and also alloys thereof. For reasons of high reflectivity and ease of preparation, particular preference is given to a reflection layer of aluminium, silver, copper, gold or their alloys.

Suitable materials for the protective layer are predominantly plastics, which are applied in a thin layer either directly or with the aid of adhesion layers to the support or the topmost layer. It is judicious to choose mechanically and thermally stable plastics having good surface properties, which can be additionally modified, for example written on. The plastics can either be thermosets or thermoplastics. Preference is given to radiation-cured (for example using UV radiation) protective layers, which are particularly easy and economic to prepare. Large numbers of radiation-curable materials are known. Examples of radiation-curable monomers and oligomers are acrylates and methacrylates or diols, triols and tetrols, polyimides of aromatic tetracarboxylic acids and aromatic diamines having $C_1$–$C_4$alkyl groups in at least two positions ortho to the amino groups, and oligomers containing dialkyl groups, for example dimethylmaleimidyl groups.

The novel recording media can also feature additional layers, for example interference layers. It is also possible to construct recording media having a plurality of (for example two) recording layers. The construction and use of such materials are known to the skilled worker. If such layers are present, preference is given to interference layers which are disposed between the recording layer and the reflecting layer and/or between the recording layer and the substrate and which consist of a dielectric material, for example as described in EP 353 393 consisting of $TiO_2$, $Si_3N_4$, ZnS or silicone resins.

The novel recording media can be prepared by a technique known per se, it being possible to employ various coating methods depending on the materials used and on their functioning.

Examples of suitable coating methods are dipping, flow coating, spreading, knife coating and spin coating, and also high-vacuum vapour deposition methods. When using flow coating methods, for example, solutions in organic solvents are generally used. When using solvents, care should be taken to ensure that the supports used are insensitive to these solvents. Examples of suitable coating methods and solvents are described in EP 401 791.

The recording layer is preferably applied by using spin coating to apply a dye solution, solvents that have been found appropriate being, in particular, alcohols such as 2-methoxy-ethanol, isopropanol, isobutanol or n-butanol or, preferably, fluorinated alcohols such as 2,2,2-trifluoroethanol or 2,2,3,3-tetrafluoro-1-propanol, and mixtures thereof.

The metallic reflection layer is preferably applied by sputtering, vapour deposition under vacuum or chemical vapour deposition (CVD). The sputtering technique is particularly preferred on account of the high degree of adhesion to the support for the application of the metallic reflection layer. These techniques are known and are described in text books (e.g. J. L. Vossen and W. Kern, "Thin Film Processes", Academic Press, 1978).

The structure of the novel recording medium depends principally on the readout method; known functional principles are the measurement of the change in transmission or, preferably, in reflection.

If the recording material is constructed in accordance with change in reflection, then the following structures are examples of those which can be employed: transparent support/recording layer (one or more layers)/reflection layer and, if useful, protective layer (not necessarily transparent), or support (not necessarily transparent)/reflection layer/recording layer and, if useful, transparent protective layer. In the former case the light is irradiated from the support side, while in the latter case the radiation is incident from the side of the recording layer or, if appropriate, from the side of the protective layer. In both cases the light detector is on the same side as the light source. The former construction of the recording material to be used in accordance with the invention is generally preferred.

If the recording material is constructed in accordance with change in light transmission, the following alternative structure is a suitable example: transparent support/recording layer (one or more layers) and, if useful, transparent protective layer. The light for recording and for readout can be irradiated alternatively from the support side or from the side of the recording layer or, if appropriate, from the side of the protective layer, the light detector in this case always being on the opposite side.

Examples of suitable lasers are commercial diode lasers, especially semiconductor diode lasers, for example He/Ne, Kr, GaAsAl, InGaAlP or GaAs laser diodes with a wavelength of 602, 612, 633, 635, 647, 650, 670 or 680 nm. Recording can be undertaken point by point with the aid of a light modulator. Preference is given to the use of diode lasers whose radiation is focussed onto the recording layer.

The novel process makes it possible to store information with high reliability and stability, featuring very good mechanical and thermal stability and also high light stability and sharp edge zones. A particular advantage is the surprisingly high signal-to-noise ratio of support material to information marking, which permits faultless readout. The high storage capacity is particularly useful in the video sector.

The information is read out by methods known per se by registering the change in absorption or in reflection using laser radiation, for example as described in "CD-Player und R-DAT Recorder" (Claus Biaesch-Wiepke, Vogel Buchverlag, Wurzburg 1992).

The novel information-containing medium constitutes in particular an optical information material of the WORM type. It can be used, for example, as a playable CD (compact disc), as storage material for computers or as an identity and security card, or for the production of diffractive optical elements such as holograms.

The invention therefore additionally provides a method of optical recording, storage and reproduction of information, wherein a novel recording medium is used. Recording and reproduction preferably take place in the wavelength range from 600 to 700 nm.

The examples which follow illustrate the invention in more detail:

EXAMPLE A1

A 100 ml three-necked flask fitted with thermometer, stirrer and water separator is charged with 2.84 g (15 mmol) of 8-hydroxyjulolidine, 2.36 g (16 mmol) of phthalic anhydride and 30 g of o-dichlorobenzene and the mixture is refluxed for 15 minutes with stirring. Then 1.8 g (10 mmol) of 8-hydroxyjulolidine are added in portions (6×0.3 g) over the course of one hour. The reaction mixture is then stirred under reflux for 3 hours more. The violet, paste-like reaction mixture is cooled, poured into 33 g of 3% NaOH solution and stirred for half an hour. The mixture is subjected to extraction three times with methylene chloride, and the combined organic phases are washed with water, dried over magnesium sulfate, filtered and concentrated by evaporation. The residue is suspended in 250 ml of hexane, the suspension is stirred vigorously for 3 hours and filtered, and the solid product is dried at 80° C. for 48 hours, to give 5.5 g (83.5% of theory) of a reddish violet powder of the formula

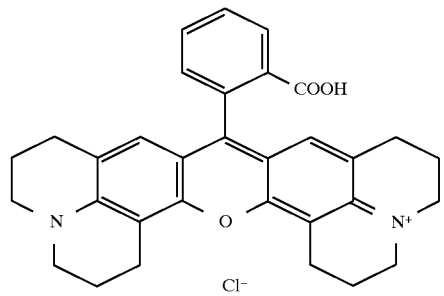

which is pure according to thin-layer chromatography (TLC; silica gel, ethanol, $R_f$=0.15).

UV (ethanol): $\lambda_{max}$=567 nm, $\epsilon$=71 950 l·mol$^{-1}$·cm$^{-1}$;

EXAMPLE A2

A 100 ml three-necked flask fitted with thermometer, stirrer and water separator is charged with 10.0 g (60.5 mmol) or 3-diethylaminophenol, 17.05 g (88.8 mmol) of trimellitic anhydride and 23.3 g of o-dichlorobenzene and the mixture is refluxed for 6 hours with stirring. The violet, paste-like reaction mixture is dissolved in 40 ml of water and 200 ml of ethanol and the solution is concentrated by evaporation at 90° C. The residue is dissolved in 90 ml of saturated sodium hydrogen carbonate solution, the solution is filtered, and the filtrate is acidified to a pH of 4 using concentrated hydrochloric acid. The precipitated crude product is filtered off, washed with 500 ml of water and dried at 70° C./165 mbar. 16 g of a violet powder are obtained which, according to TLC (eluent ethanol), still contains polar impurities. The crude product is purified by chromatography on silica gel in a flash column using ethanol as eluent, to give 2.8 g (9% of theory) of a violet powder of the formula:

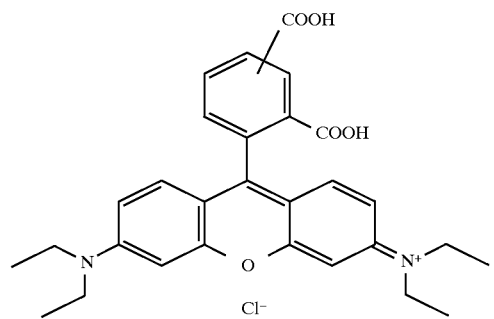

UV (ethanol): $\lambda_{max}$=546 nm, $\epsilon$=74 150 l·mol$^{-1}$·cm$^{-1}$; TLC (silica gel; ethanol): $R_f$=0.20 and 0.11 respectively for the two possible isomers.

EXAMPLE A3

25 ml of concentrated $H_2SO_4$ are added dropwise over the course of 10 minutes to an initial charge of 500 ml of methanol in a 1000 ml three-necked flask fitted with magnet stirrer, thermometer, reflux condenser and nitrogen blanketing means. Then 10 g (20.8 mmol) of rhodamine B are added and the red solution is refluxed for 16 hours. The reaction mixture is then cooled and the solvent is evaporated. The residue is poured into 250 ml of saturated NaCl solution and subjected to extraction 3× with 250 ml of $CH_2Cl_2$ each time. The combined organic phases are washed twice with 250 ml of water each time, dried over $MgSO_4$, filtered and concentrated by evaporation. The reddish violet residue is dissolved in 30 ml of methanol under reflux. The solution is cooled to 0° C. with stirring, and then 150 ml of diethyl ether ($Et_2O$) are added slowly until the formation of crystals begins. Then a further 300 ml of $Et_2O$ are added and the suspension is stirred for 15 minutes. The precipitate is filtered off, washed 3× with 50 ml of $Et_2O$ each time and dried at 60° C./165 mbar, to give 8.64 g (84.2% of theory) of greenish violet crystals which have a metallic lustre and are of the formula:

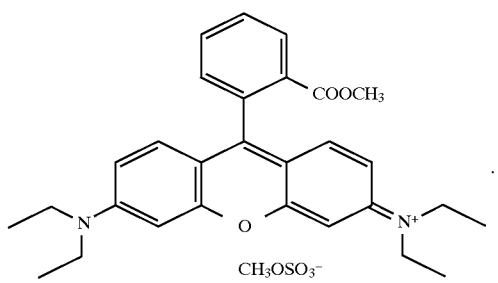

UV (ethanol): $\lambda_{max}$=556 nm, $\epsilon$=119 210 $l\cdot mol^{-1}\cdot cm^{-1}$; TLC (silica gel; ethanol/1N HCl 20:1): $R_f$=0.56. Elemental analysis: C 63.91% H 6.35% N 5.17% S 5.65%; (theoretical: C 63.36% H 6.38% N 4.93% S 5.64%).

EXAMPLE A4

A 250 ml three-necked flask fitted with magnetic stirrer, thermometer, reflux condenser, dropping funnel and nitrogen blanketing means is charged with 10 g (20.8 mmol) of rhodamine B in 100 ml of dimethylformamide (DMF). With stirring, 10.15 g (62.6 mmol) of carbonyldiimidazole are added and the mixture is heated to 40° C. After 30 minutes the evolution of gas is at an end and the reaction mixture is cooled to room temperature (RT). 7 g (68.9 mmol) of di-n-propylamine are added dropwise and the mixture is stirred for 45 minutes. According to TLC (silica gel; ethanol/ 1N HCl 20:1) starting material is no longer present. The reaction mixture is poured into 500 ml of 1N HCl and subjected to extraction 4× with 150 ml of $CH_2Cl_2$ each time. The combined organic phases are washed with 100 ml of 1N HCl and 4× with 100 ml of water each time, dried over $MgSO_4$, filtered and concentrated by evaporation. The residue is dissolved in 200 ml of acetone under reflux, the solution is cooled to RT, 800 ml of $Et_2O$ are carefully added, and the suspension is stirred at 0° C. for 15 minutes. It is then filtered, and the residue is washed 3 times with 50 ml of $Et_2O$ and dried at 60° C./165 mbar, to give 7.0 g (59.7% of theory) of violet crystals, with a metallic lustre, of the formula:

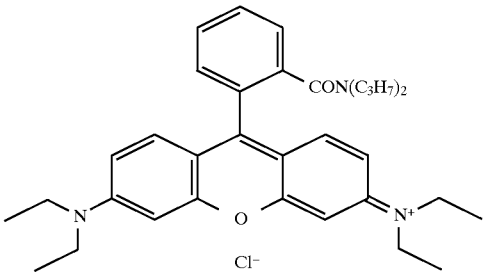

UV (ethanol): $\lambda_{max}$=563 nm, $\epsilon$=109 420 $l\cdot mol^{-1}\cdot cm^{-1}$; TLC (silica gel; ethanol/1N HCl 20:1): $R_f$=0.69. Elemental analysis: C 71.05% H 7.82% N 7.35% Cl 5.69%; (theoretical: C 72.64% H 7.89% N 7.47% Cl 6.31%).

EXAMPLE A5

A 100 ml three-necked flask fitted with thermometer, stirrer and water separator is charged with 3.6 g (21.6 mmol) of 3-diethylaminophenol, 4.8 g (25 mmol) of 4-nitrophthalic anhydride and 30 g of o-dichlorobenzene and the mixture is refluxed for 7 hours with stirring. 33 g of 3% aqueous NaOH solution are added to the violet reaction mixture, the phases are separated and the organic phase is acidified with 66 g of 5% $H_2SO_4$. The mixture is subjected to extraction 3× with 100 ml of $CH_2Cl_2$ each time, and the combined organic phases are washed with 150 ml of saturated NaCl solution, dried over $MgSO_4$, filtered and concentrated by evaporation. The residue is filtered over 250 g of silica gel using ethanol/1N HCl 100:1 in order to remove apolar impurities, to give 1.6 g (28.3% of theory) of a violet powder of the formula:

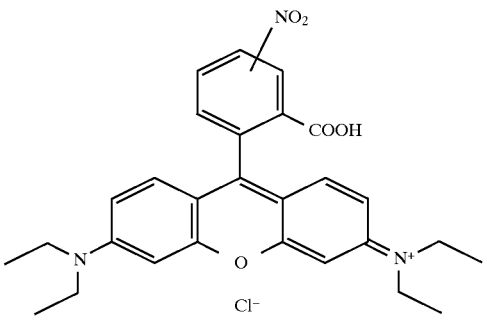

UV (ethanol): $\lambda_{max}$=553 nm, $\epsilon$=58 910 $l\cdot mol^{-1}\cdot cm^{-1}$; TLC (silica gel; ethanol/1N HCl 100:1): $R_f$=0.29 and 0.51 respectively for the two possible isomers.

EXAMPLE A6

A 25 ml three-necked flask fitted with magnetic stirrer, thermometer, reflux condenser, dropping funnel and nitrogen blanketing means is charged with 0.6 g (1.14 mmol) of the compound prepared in Example A5 and 10 ml of DMF. 0.55 g (3.43 mmol) of carbonylduimidazole is added with stirring and the mixture is heated to 40° C. After 30 minutes the evolution of gas is at an end and the reaction mixture is cooled to RT. 0.38 g (3.76 mmol) of dipropylamine is added dropwise and the mixture is stirred for 20 hours. According to TLC (silica gel; ethanol/1N HCl 100:1) a very small amount of starting material remains. The reaction mixture is poured into 80 ml of 1N HCl and the mixture is subjected to extraction 4 times with 80 ml of $CH_2Cl_2$. The combined organic phases are washed with 50 ml of 1N HCl and 4× with 80 ml of water, dried over MgSO₄, filtered and concentrated by evaporation. The residue is dissolved in 2 ml of acetone, 200 ml of Et₂O are added carefully, and the suspension is stirred at 0° C. for 15 minutes. It is then filtered and the residue is washed 3× with 10 ml of Et₂O each time and dried at 60° C./165 mbar, to give 0.3 g (43.3% of theory) of violet crystals of the formula:

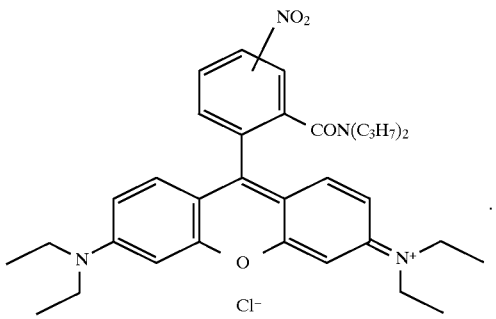

UV (ethanol): $\lambda_{max}$=571 nm, $\epsilon$=92 800 l·mol⁻¹·cm⁻¹; TLC (silica gel; ethanol/1N HCl 100:1): $R_f$=0.57 and 0.71 respectively for the two possible isomers.

EXAMPLE A7

A 100 ml three-necked flask fitted with thermometer, stirrer and water separator is charged with 3.6 g (21.6 mmol) of 3-diethylaminophenol, 5.42 g (25 mmol) of 4,5-dichlorophthalic anhydride and 30 g of o-dichlorobenzene and the mixture is refluxed for 6 hours with stirring. 33 g of 3% aqueous NaOH solution are added to the violet reaction mixture, the phases are separated and the organic phase is acidified with 66 g of 5% H₂SO₄. The phases are separated, and the organic phase is washed with 100 ml of saturated NaCl solution, dried over MgSO₄, filtered and concentrated by evaporation. The residue is dissolved in 100 ml of acetone, and 500 ml of Et₂O are added carefully. The suspension is stirred for 15 minutes and filtered and the residue is washed 3× with 50 ml of Et₂O each time and dried at 60° C./165 mbar, to give 3.2 g (54.2% of theory) of a violet powder of the formula:

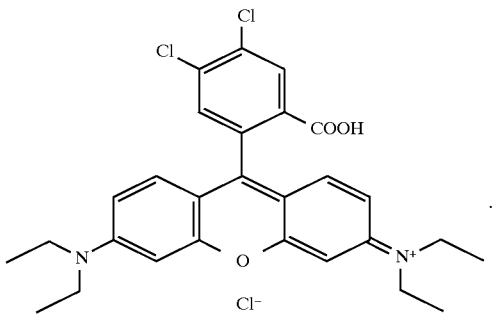

UV (ethanol): $\lambda_{max}$=551 nm, $\epsilon$=77 650 l·mol⁻¹·cm⁻¹; TLC (silica gel; ethanol/1N HCl 100:1): $R_f$=0.48.

EXAMPLE A8

A 100 ml three-necked flask fitted with magnetic stirrer, thermometer, reflux condenser and nitrogen blanketing means is charged with 50 ml of methanol, and 2.5 ml of concentrated H₂SO₄ are added dropwise over the course of 10 minutes. Then 1 g (1.82 mmol) of the compound prepared in Example A7 is added and the red solution is refluxed for 17 hours. The reaction mixture is then cooled and the solution is concentrated by evaporation. The residue is poured into 100 ml of water and subjected to extraction 4× with 80 ml of CH₂Cl₂ each time. The combined organic phases are washed with 100 ml of water, dried over MgSO₄, filtered and concentrated by evaporation. The reddish violet residue is dissolved in 7 ml of acetone. 300 ml of Et₂O are added to the solution, with stirring, and the suspension which forms is stirred for 15 minutes. The precipitate is filtered off, washed 3× with 10 ml of Et₂O each time and dried at 60° C./165 mbar, to give 0.70 g (60.3% of theory) of violet crystals of the formula:

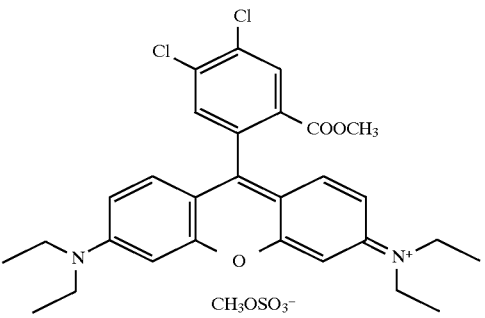

UV (ethanol):$\lambda_{max}$=564 nm, $\epsilon$=74 630 l·mol⁻¹·cm⁻¹; TLC (silica gel; ethanol/1N HCl 100:1): $R_f$=0.81. Elemental analysis: C 54.55% H 5.22% N 4.04% S 4.57% Cl 10.55%; (theoretical: C 56.52% H 5.39% N 4.39% S 5.03% Cl 11.12%).

EXAMPLE A9

A 100 ml three-necked flask fitted with magnetic stirrer, thermometer, reflux condenser and nitrogen blanketing means is charged with 50 ml of methanol, and 2.5 ml of concentrated H₂SO₄ are added dropwise over the course of 10 minutes. Then 1 g (1.82 mmol) of the compound prepared in Example A1 is added and the red solution is refluxed for 17 hours. The reaction mixture is then cooled and the solvent is evaporated. The residue is poured into 100 ml of saturated NaCl solution and the mixture is subjected to extraction 4× with 80 ml of CH₂Cl₂ each time. The combined organic phases are washed twice with 80 ml of water each time, dried over MgSO₄, filtered and concentrated by evaporation. The reddish violet residue is dissolved in 4 ml of acetone. 300 ml of Et₂O are added to the solution, with stirring, until the formation of crystals begins, and the suspension is stirred for 15 minutes. The precipitate is filtered, washed 3× with 10 ml of Et₂O each time and dried at 60° C./165 mbar, to give 0.50 g (46.8% of theory) of violet crystals of the formula:

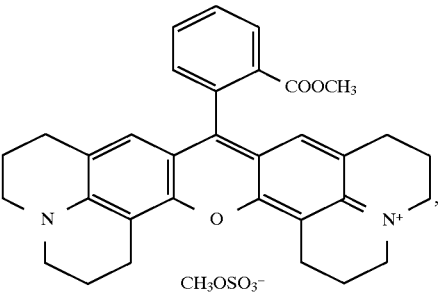

UV (ethanol):$\lambda_{max}$=576 nm, $\epsilon$=48 170 l·mol⁻¹·cm⁻¹; TLC (silica gel; ethanol/1N HCl 100:1): $R_f$=0.50.

EXAMPLE A10

A 100 ml three-necked flask fitted with thermometer, stirrer and water separator is charged with 5.0 g (26.4 mmol) of 8-hydroxyjulolidine, 5.9 g (30.65 mmol) of 4-nitrophthalic anhydride and 40 g of o-dichlorobenzene and the mixture is refluxed for 3 hours with stirring. The violet, paste-like reaction mixture is cooled and concentrated as far as possible, by evaporation, at 80° C./1·10$^{-3}$ mbar.

The residue is flash-chromatographed with ethanol/1N HCl 100:1 on silica gel, to give 1.7 g (22.5% of theory) of a violet powder of the formula:

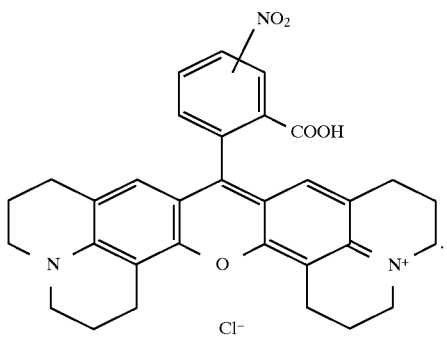

UV (ethanol): $\lambda_{max}$=577 nm, $\epsilon$=73 410 l·mol$^{-1}$·cm$^{-1}$; TLC (silica gel; ethanol/1N HCl 100:1): $R_f$=0.18 and 0.27 respectively for the two possible isomers.

EXAMPLE A11

A 100 ml three-necked flask fitted with magnetic stirrer, thermometer, reflux condenser and nitrogen blanketing means is charged with 30 ml of methanol, and 1.5 ml of concentrated H$_2$SO$_4$ are added dropwise over the course of 10 minutes. Then 0.6 g (1.05 mmol) of the compound prepared in Example A10 is added, and the solution is refluxed for 16 hours. The reaction mixture is then cooled and the solvent is evaporated. The residue is poured into 80 ml of saturated NaCl solution and subjected to extraction 6× with 50 ml of CH$_2$Cl$_2$ each time. The combined organic phases are washed twice with 80 ml of water each time, dried over MgSO$_4$, filtered and concentrated by evaporation, to give 0.60 g (97.5% of theory) of a violet powder of the formula:

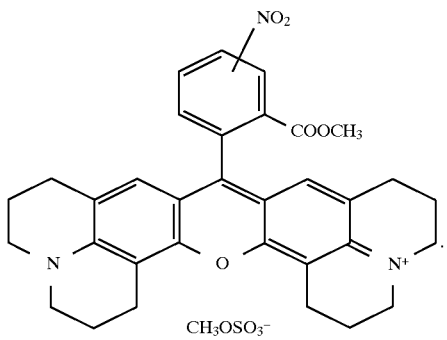

UV (ethanol): $\lambda_{max}$=585 nm, $\epsilon$=60 990 l·mol$^{-1}$·cm$^{-1}$; TLC (silica gel; ethanol/1N HCl 100:1): $R_f$=0.49.

EXAMPLE A12

A 50 ml three-necked flask fitted with magnetic stirrer, thermometer, reflux condenser, dropping funnel and nitrogen blanketing means is charged with 1.7 g (2.97 mmol) of the compound prepared in Example A10 in 20 ml of DMF. 4.8 g (29.7 mmol) of carbonyldiimidazole are added with stirring and the mixture is heated at 40° C. After 45 minutes the evolution of gas is at an end and the reaction mixture is cooled to RT. 3.6 g (35.7 mmol) of di-n-propylamine are added dropwise and the mixture is stirred for 1½ hours. According to TLC (silica gel; ethanol/1N HCl 20:1), a very small amount of starting material is still present. The reaction mixture is poured into 100 ml of 1N HCl and subjected to extraction 5× with 90 ml of CH$_2$Cl$_2$ each time. The combined organic phases are washed with 100 ml of 1N HCl and 4× with 80 ml of water each time, dried over MgSO$_4$, filtered and concentrated by evaporation. 250 ml of Et$_2$O are added to the residue, and the suspension is stirred for 15 minutes. It is then filtered, and the residue is washed 3× with 20 ml of Et$_2$O each time and dried at 60° C./165 mbar, to give 1.2 g (61.7% of theory) of violet crystals of the formula:

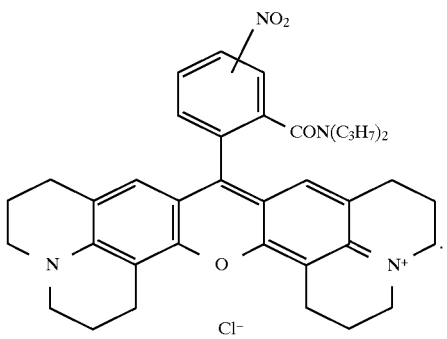

UV (ethanol): $\lambda_{max}$=592 nm, $\epsilon$=86 540 l·mol$^{-1}$·cm$^{-1}$; TLC (silica gel; ethanol/1N HCl 100:1): $R_f$=0.46.

EXAMPLE A13

A 50 ml three-necked flask fitted with magnetic stirrer, thermometer, reflux condenser and nitrogen blanketing means is charged with 0.7 g (1.07 mmol) of the compound prepared in Example A12, 60 mg of active charcoal, 3 mg of FeCl$_3$ and 0.64 g (10.7 mmol) of N,N-dimethylhydrazine in 20 ml of methanol and the suspension is refluxed for 18 hours with stirring. The reaction mixture is subsequently cooled and the solvent is evaporated. The residue is purified by flash chromatography on silica gel using ethanol/1N HCl 100:1, to give 0.6 g (89.7% of theory) of a blue powder of the formula:

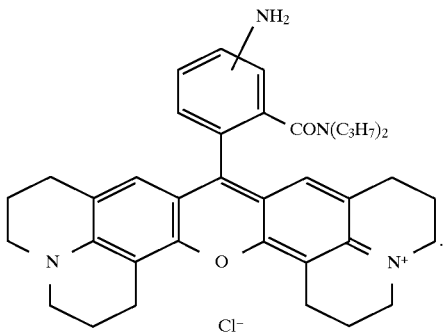

UV (ethanol): $\lambda_{max}$=578 nm, $\epsilon$=73 720 l·mol$^{-1}$·cm$^{-1}$;

EXAMPLE A14

A 100 ml three-necked flask fitted with magnetic stirrer, thermometer, reflux condenser and nitrogen blanketing means is charged with 3.8 g (5 mmol) of ®Orasol Yellow 3R (Ciba-Geigy AG) and 30 ml of n-butanol and the mixture is heated to 70° C. with stirring. Subsequently, 2.4 g (5 mmol) of rhodamine B are added, and then the pH is adjusted to 2 using about 1 ml of formic acid. The reaction mixture is stirred at 70° C. for 5 hours, then 1 g of filter aid is added and the suspension is filtered while hot. The residue is washed with 100 ml of hot n-butanol and the filtrate is concentrated by evaporation. 300 ml of Et$_2$O are added to the paste-like residue, and the suspension which forms is stirred for 10 minutes. It is subsequently filtered and the residue is washed 3× with 50 ml of Et$_2$O each time, to give 5.2 g (87.9% of theory) of a red powder of the formula:

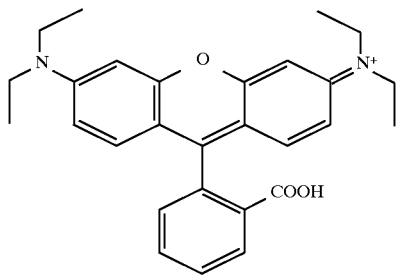

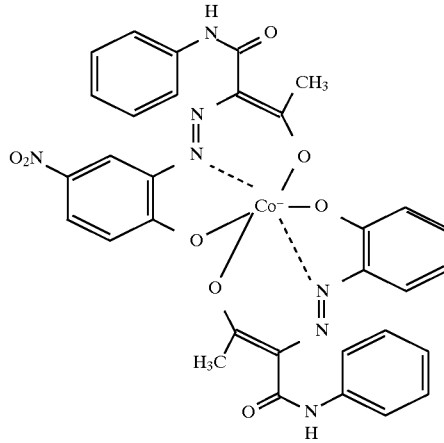

UV (ethanol): $\lambda_{max}$=543 nm, $\epsilon$=87 390 l·mol$^{-1}$·cm$^{-1}$; Elemental analysis: Na 648 ppm.

EXAMPLE A15

A 100 ml three-necked flask fitted with magnetic stirrer, thermometer, reflux condenser and nitrogen blanketing means is charged with 2.0 g (2.66 mmol) of ®Orasol Yellow 3R (Ciba-Geigy AG) and 30 ml of n-butanol and the mixture is heated to 70° C. with stirring. Subsequently, 1.5 g (2.66 mmol) of the compound prepared in Example A4 are added, and then the pH is adjusted to 2 using about 1.5 ml of formic acid. The reaction mixture is stirred at 70° C. for 5 hours, then 1 g of filter aid is added and the suspension is filtered while hot. The residue is washed with 100 ml of hot n-butanol and the filtrate is concentrated by evaporation. 200 ml of Et$_2$O are added to the paste-like residue, and the suspension which forms is stirred for 10 minutes. It is subsequently filtered and the residue is washed with 80 ml of Et$_2$O, to give 3.0 g (89.0% of theory) of a red powder of the formula:

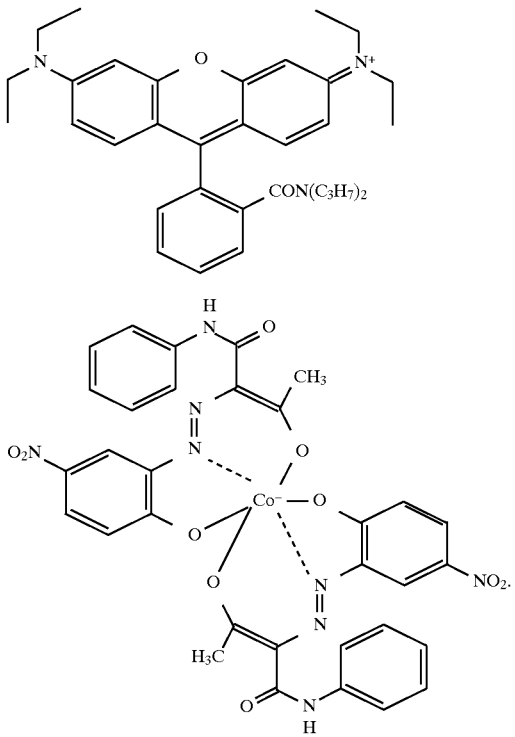

UV (ethanol): $\lambda_{max}$=562 nm, $\epsilon$=120 520 l·mol$^{-1}$·cm$^{-1}$; Elemental analysis: Na 0.41%.

EXAMPLE A16

A 100 ml flask is charged with 1 g (1.76 mmol) of the compound prepared in Example A3, 1.34 g (1.76 mmol) of ®Orasol Yellow 3R (Ciba-Geigy AG) and 30 ml of CH$_2$Cl$_2$. The red solution is subsequently concentrated by evaporation at 50° C. and the residue is dried at 60° C./165 mbar, to give 2.3 g (98.3% of theory) of a dark red powder of the formula:

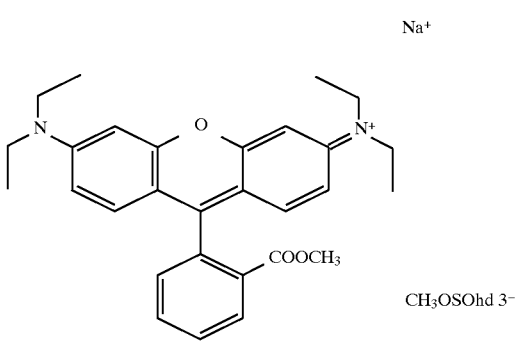

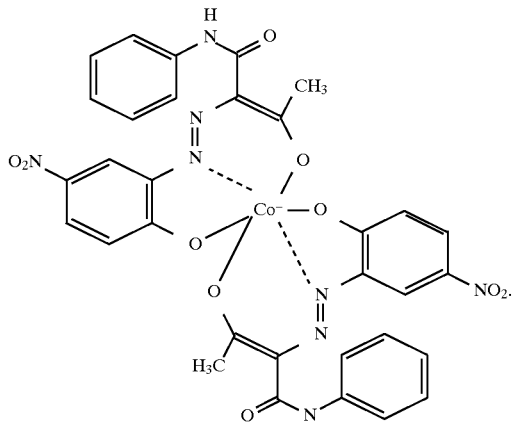

UV (ethanol): $\lambda_{max}$=555 nm, $\epsilon$=122 290 l·mol$^{-1}$·cm$^{-1}$.

EXAMPLE A17

A 100 ml flask is charged with 1 g (1.78 mmol) of the compound prepared in Example A4, 1.36 g (1.78 mmol) of ®Orasol Yellow 3R (Ciba-Geigy AG) and 30 ml of CH$_2$Cl$_2$. The red solution is subsequently concentrated by evaporation at 50° C. and the residue is dried at 60° C./165 mbar, to give 2.3 g (97.4% of theory) of a dark red powder of the formula:

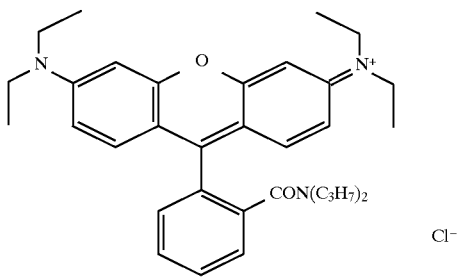
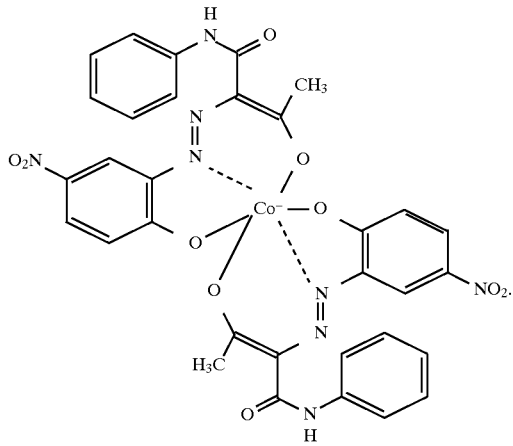

UV (ethanol): $\lambda_{max}$=563 nm, $\epsilon$=120 950 l·mol$^{-1}$·cm$^{-1}$.

EXAMPLE A18

The product prepared in Example A17 is suspended in 50 ml of water, the suspension is stirred for 30 minutes and filtered, and the solid product is washed with 100 ml of water and dried, to give in quantitative yield a dark red powder of the formula:

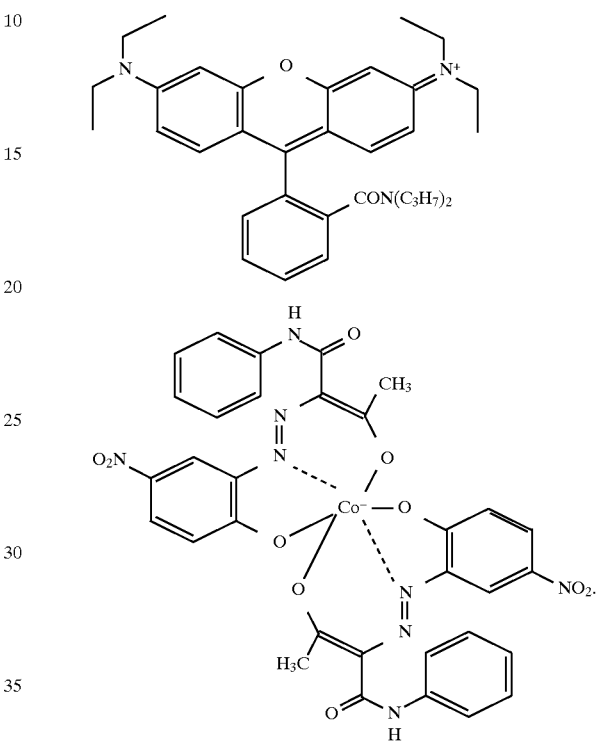

UV (ethanol): $\lambda_{max}$=563 nm, $\epsilon$=122 430 l·mol$^{-1}$·cm$^{-1}$; Elemental analysis: Na 0.62%.

EXAMPLE A19

A 100 ml flask is charged with 1 g (1.78 mmol) of the compound prepared in Example A4, 1.36 g (1.78 mmol) of ®Orasol Yellow 3R (Ciba-Geigy AG) and 40 ml of CH$_2$Cl$_2$. The red solution is washed 3× with 100 ml of water each time, dried over MgSO$_4$ and concentrated by evaporation. The residue is dried at 60° C./165 m bar, to give 2.2 g (97.6% of theory) of a dark red powder of the formula:

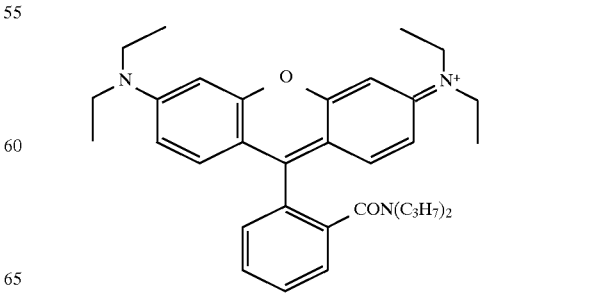

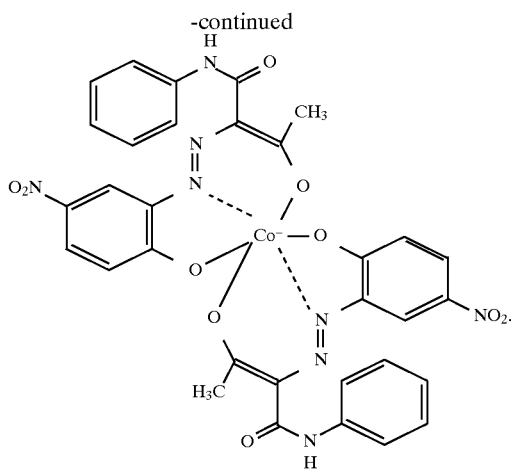

UV (ethanol): $\lambda_{max}$=563 nm, $\epsilon$=108 940 l·mol$^{-1}$·cm$^{-1}$; Elemental analysis: Na 0.16%.

EXAMPLE A20

A 100 ml three-necked flask fitted with magnetic stirrer, thermometer, reflux condenser and nitrogen blanketing means is charged with 2.4 g (2.66 mmol) of ®Orasol Red GL (Ciba-Geigy AG) and 30 ml of n-butanol and the mixture is heated to 70° C. with stirring. Subsequently, 1.5 g (2.66 mmol) of the compound prepared in Example A4 are added, and then the pH is adjusted to 2 using about 1.5 ml of formic acid. The reaction mixture is stirred at 70° C. for 5 hours, then 1 g of filter aid is added, the suspension is filtered while hot and the residue is washed with 80 ml of hot n-butanol. The filtrate is concentrated by evaporation and 200 ml of Et$_2$O are added to the residue. The suspension which forms is stirred for 10 minutes and then filtered. The residue is washed with 80 ml of Et$_2$O and dried at 50° C./165 mbar, to give 3.4 g (90.7% of theory) of a dark red powder of the formula:

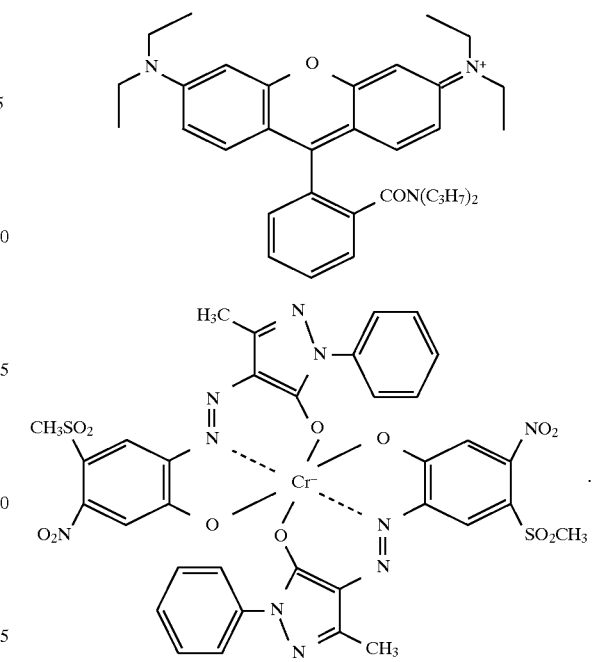

UV/VIS (ethanol): $\lambda_{max}$=562 nm, $\epsilon$=123 600 l·mol$^{-1}$·cm$^{-1}$; Elemental analysis: Na 0.17%.

EXAMPLES A21–A23

The procedure of Example A15 is repeated but using, instead of ®Orasol Yellow 3R, in each case an equimolar amount of ®Orasol Red 2BL, ®Orasol Red 3GL or

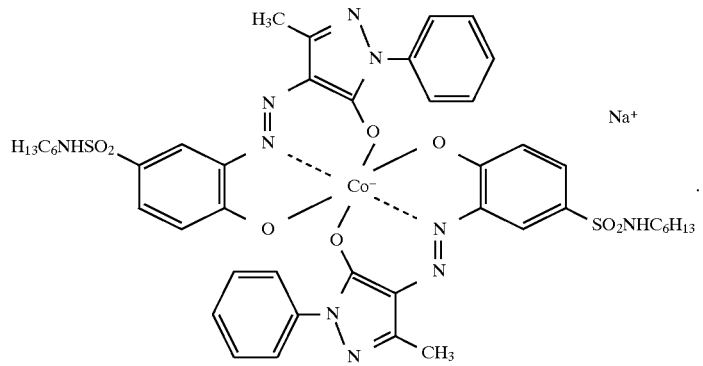

The following compounds are obtained:
A21:
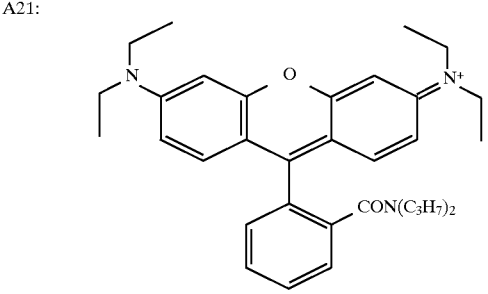
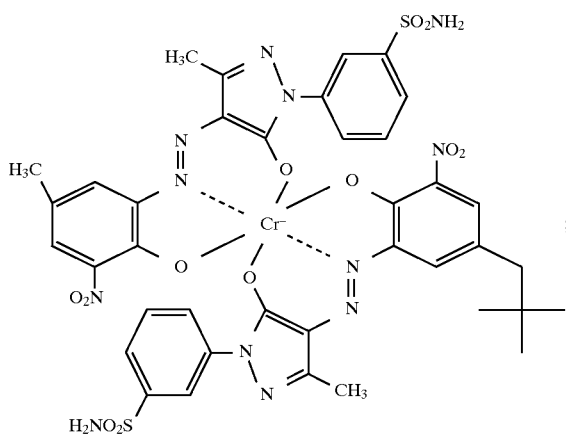
UV/VIS (ethanol): $\lambda_{max}$=554 nm, $\epsilon$=115 240 l·mol$^{-1}$·cm$^{-1}$;
A22:
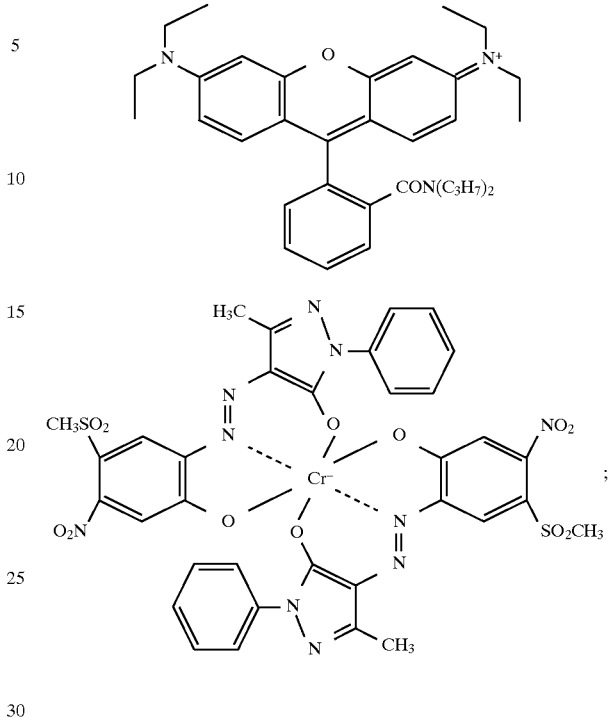
UV/VIS (ethanol): $\lambda_{max}$=554 nm, $\epsilon$=113 130 l·mol$^{-1}$·cm$^{-1}$;
A23:
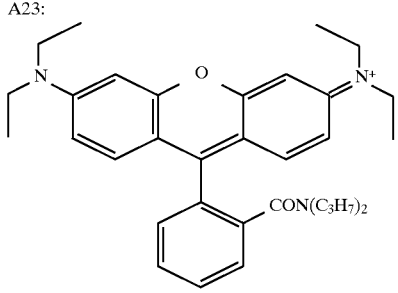
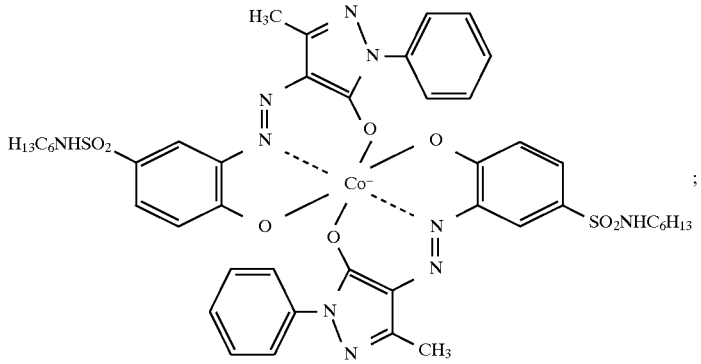
UV/VIS (ethanol): $\lambda_{max}$=555 nm, $\epsilon$=116 290 l·mol$^{-1}$·cm$^{-1}$;

EXAMPLES A24–A26

The procedure of Examples A21–A23 is repeated using, instead of the compound of Example A4, in each case an equimolar amount of the compound of Example A3. The following compounds are obtained:

A24:

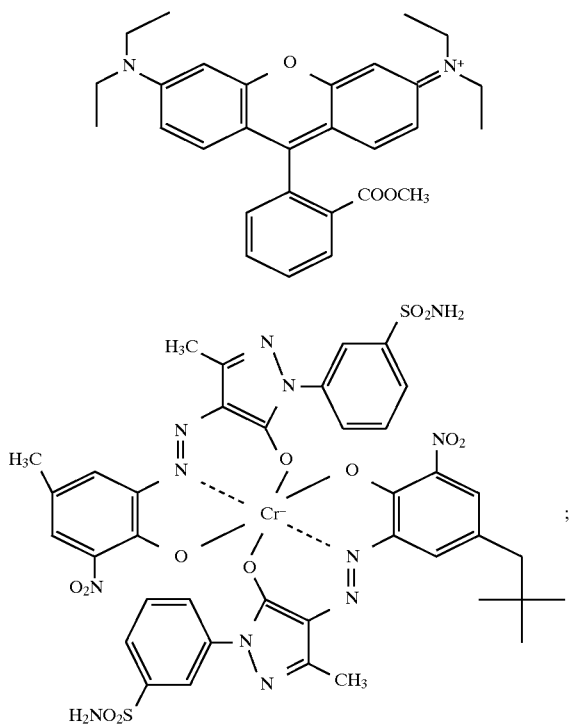

UV/VIS (ethanol): $\lambda_{max}$=562 nm, $\epsilon$=151 990 l·mol$^{-1}$·cm$^{-1}$;

A25:

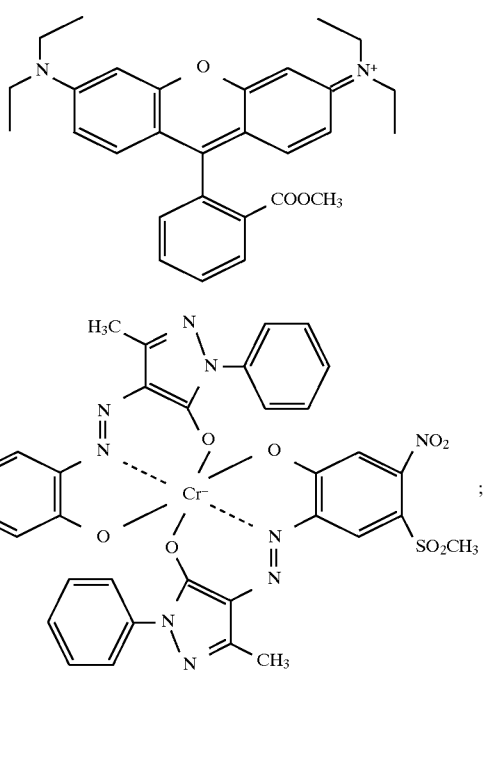

UV/VIS (ethanol): $\lambda_{max}$=562 nm, $\epsilon$=123 610 l·mol$^{-1}$·cm$^{-1}$.

UV/VIS (ethanol): $\lambda_{max}$=563 nm, $\epsilon$=119 030 l·mol$^{-1}$·cm$^{-1}$;

A26:

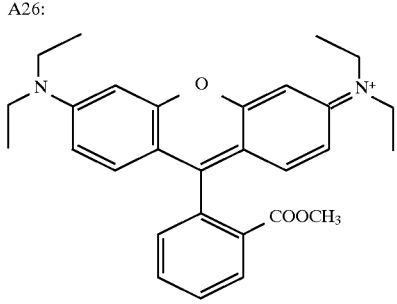

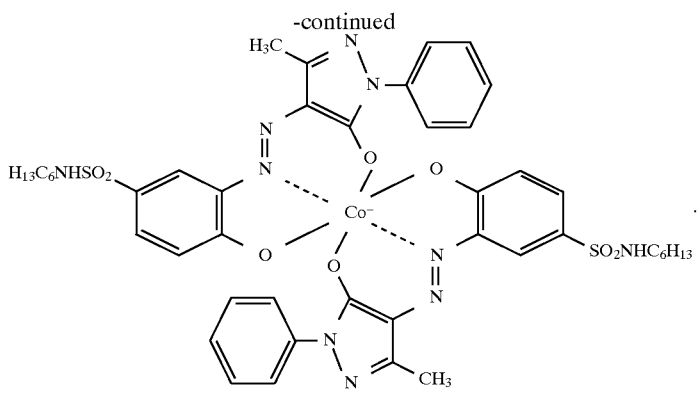

EXAMPLES A27–A30

The procedure of Example A17 is repeated but using, instead of ®Orasol Yellow 3R, in each case an equimolar amount of ®Orasol Yellow 2RLN, ®Orasol Orange G, ®Orasol Red 2B or ®Orasol Yellow 2GLN. The subsequent procedure is as in Example 18. The following compounds are obtained:

A27:

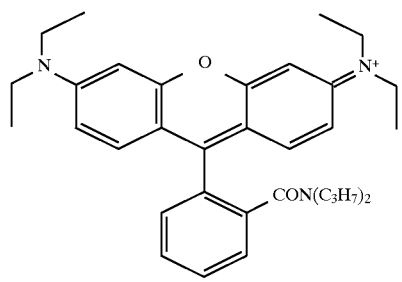

;

UV/VIS (ethanol): $\lambda_{max}$=563 nm, $\epsilon$=98 920 l·mol$^{-1}$·cm$^{-1}$.

A28:

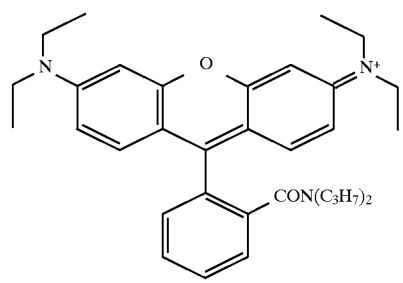

;

UV/VIS (ethanol): $\lambda_{max}$=563 nm, $\epsilon$=100 884 l·mol$^{-1}$·cm$^{-1}$.

A29:

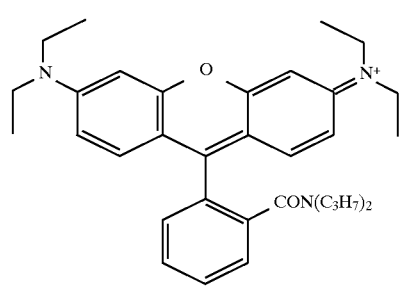

-continued

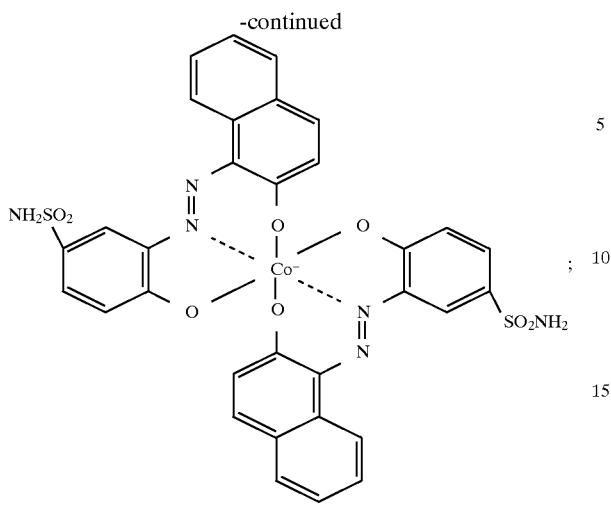

UV/VIS (ethanol): $\lambda_{max}$=562 nm, $\epsilon$=109 040 l·mol$^{-1}$·cm$^{-1}$.

A30:

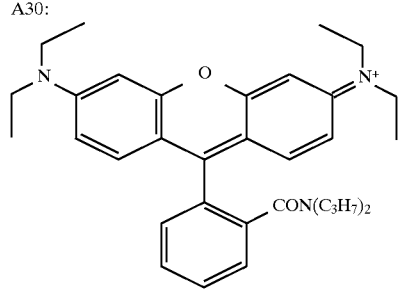

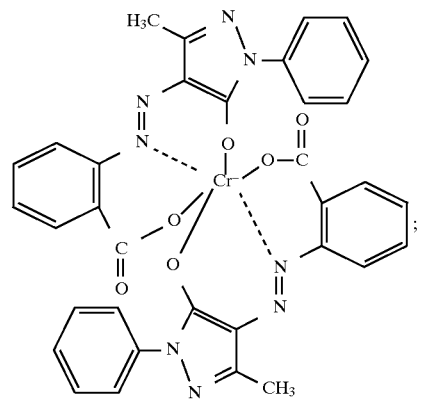

UV/VIS (ethanol): $\lambda_{max}$=563 nm, $\epsilon$=97 930 l·mol$^{-1}$·cm$^{-1}$.

EXAMPLES A31–A34

The procedure of Examples A27–A30 is repeated but using, instead of the compound of Example A4, in each case an equimolar amount of the compound of Example A3. The following compounds are obtained:

A31:

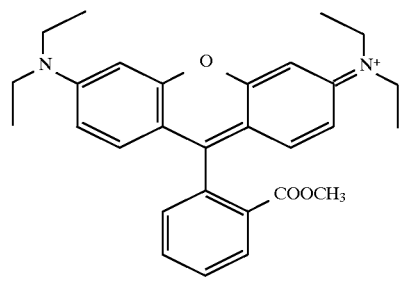

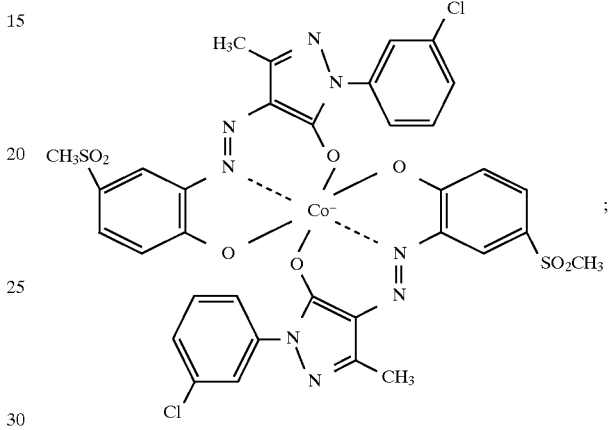

UV/VIS (ethanol): $\lambda_{max}$=554 nm, $\epsilon$=92 418 l·mol$^{-1}$·cm$^{-1}$.

A32:

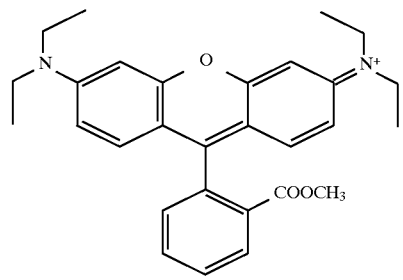

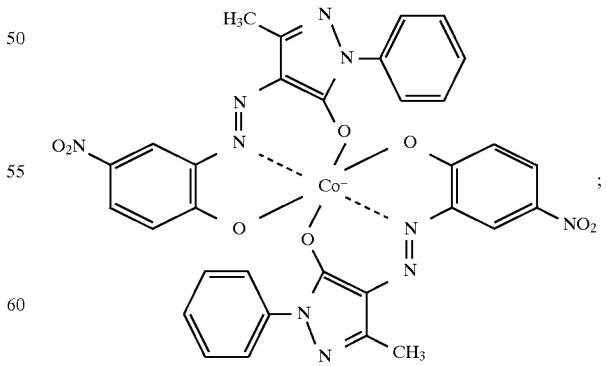

UV/VIS (ethanol): $\lambda_{max}$=554 nm, $\epsilon$=93 970 l·mol$^{-1}$·cm$^{-1}$.

A33:

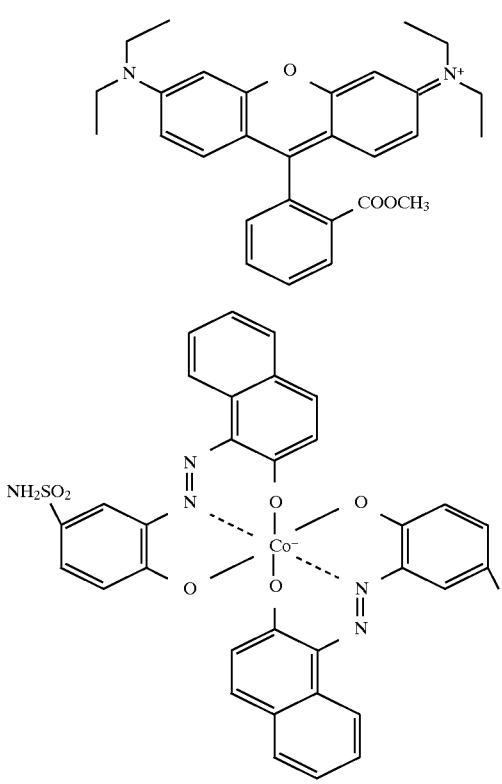

UV/VIS (ethanol): $\lambda_{max}$=554 nm, $\epsilon$=114 090 l·mol$^{-1}$·cm$^{-1}$.

A34:

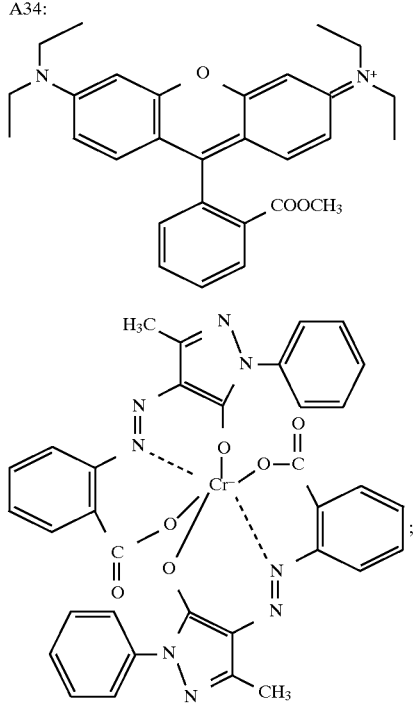

UV/VIS (ethanol): $\lambda_{max}$=555 nm, $\epsilon$=104 450 l·mol$^{-1}$·cm$^{-1}$.

EXAMPLE A35

The procedure of Example A17 is repeated but using, instead of ®Orasol Yellow 3R, an equimolar amount of ®Orasol Orange RG and, instead of the compound of Example A4, an equimolar amount of the compound of Example A3. The following compound is obtained:

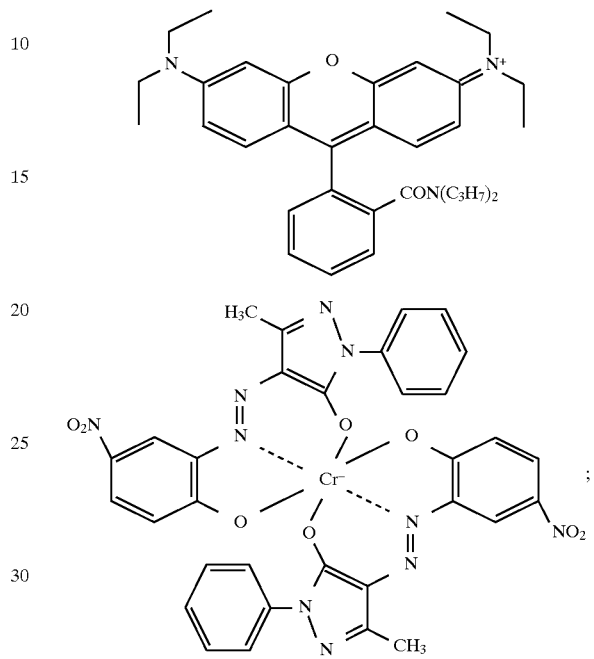

UV/VIS (ethanol): $\lambda_{max}$=554 nm, $\epsilon$=100 210 l·mol$^{-1}$·cm$^{-1}$.

EXAMPLE A36

The procedure of Example A1 is repeated but using, instead of phthalic anhydride, an equimolar amount of tetrachlorophthalic anhydride. The following compound is obtained:

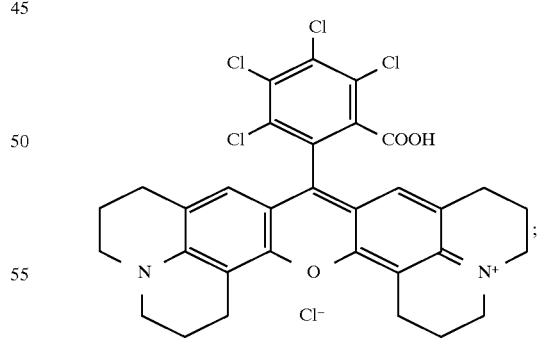

UV/VIS (ethanol): $\lambda_{max}$=596 nm, $\epsilon$=75 901 l·mol$^{-1}$·cm$^{-1}$.

EXAMPLE A37

The procedure of Example A1 is repeated but using, instead of 8-hydroxyjulolidine, an equimolar amount of 3-dimethylaminophenol. The following compound is obtained:

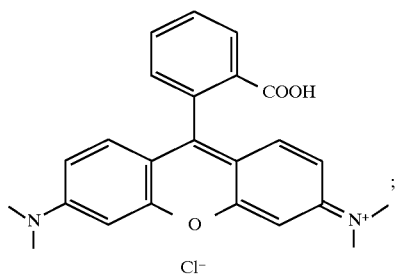

UV/VIS (ethanol): $\lambda_{max}$=537 nm, $\epsilon$=36 960 l·mol$^{-1}$·cm$^{-1}$.

EXAMPLE A38

The procedure of Example A1 is repeated but using, instead of 8-hydroxyjulolidine, an equimolar amount of 3-dibutylaminophenol. The following compound is obtained:

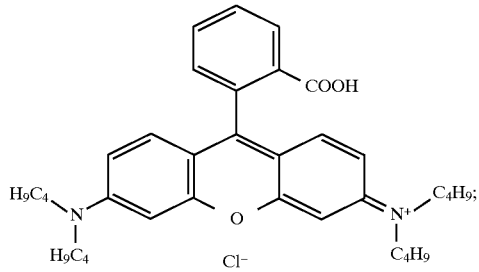

UV/VIS (ethanol): $\lambda_{max}$=547 nm, $\epsilon$=29 600 l·mol$^{-1}$·cm$^{-1}$.

EXAMPLE A39

The procedure of Example A1 is repeated but using, instead of 8-hydroxyjulolidine, an equimolar amount of 3-morpholinophenol. The following compound is obtained:

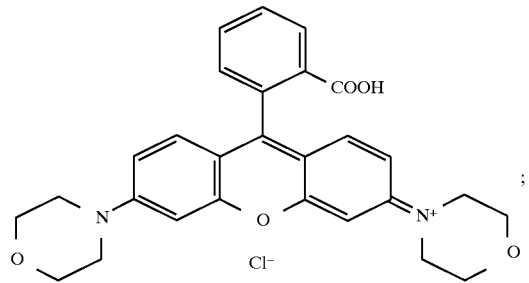

UV/VIS (ethanol): $\lambda_{max}$=549 nm, $\epsilon$=12 500 l·mol$^{-1}$·cm$^{-1}$.

EXAMPLE A40

The procedure of Example A1 is repeated but using, instead of 8-hydroxyjulolidine and phthalic anhydride, equimolar amounts of 3-diethylaminophenol and 2,3-naphthalenedicarboxylic anhydride. The following compound is obtained:

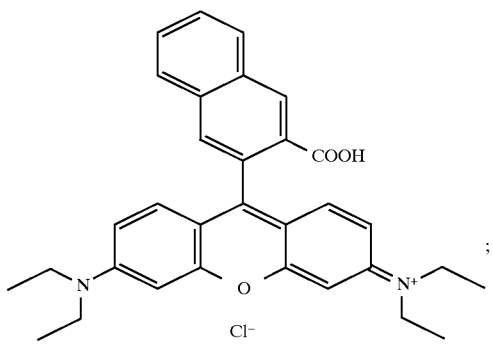

UV/VIS (ethanol): $\lambda_{max}$=544 nm, $\epsilon$=74 966 l·mol$^{-1}$·cm$^{-1}$.

EXAMPLE A41

The procedure of Example A3 is repeated but using ethanol instead of methanol, to give the following compound:

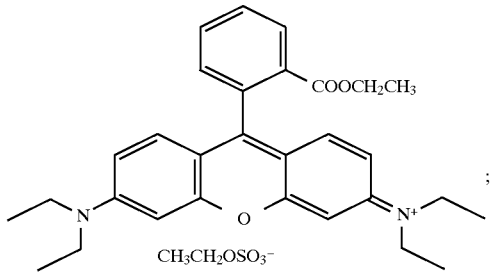

UV/VIS (ethanol): $\lambda_{max}$=556 nm, $\epsilon$=114 830 l·mol$^{-1}$·cm$^{-1}$.

EXAMPLE A42

The procedure of Example A3 is repeated but using isopropanol instead of methanol, to give the following compound:

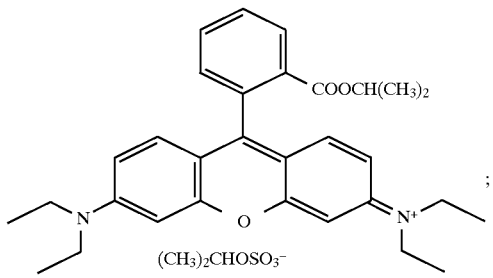

UV/VIS (ethanol): $\lambda_{max}$=555 nm, $\epsilon$=66 300 l·mol$^{-1}$·cm$^{-1}$.

EXAMPLE A43

The procedure of Example A3 is repeated but using, instead of rhodamine B, an equimolar amount of the compound of Example A37. The following compound is obtained:

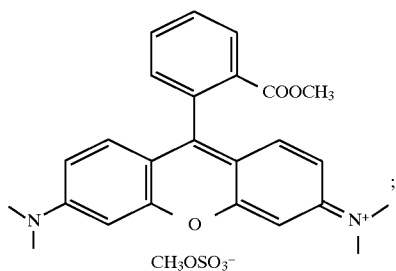

UV/VIS (ethanol): $\lambda_{max}$=550 nm, $\epsilon$=91 800 l·mol$^{-1}$·cm$^{-1}$.

EXAMPLE A44

The procedure of Example A3 is repeated but using, instead of rhodamine B, an equimolar amount of the compound of Example A38. The following compound is obtained:

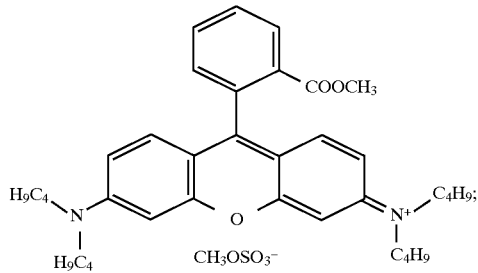

UV/VIS (ethanol): $\lambda_{max}$=561 nm, $\epsilon$=57 490 l·mol$^{-1}$·cm$^{-1}$.

EXAMPLE A45

The procedure of Example A3 is repeated but using, instead of rhodamine B, an equimolar amount of the compound of Example A39. The following compound is obtained:

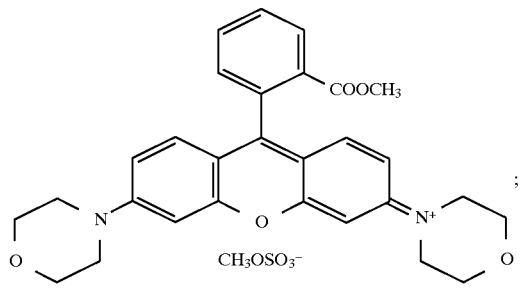

UV/VIS (ethanol): $\lambda_{max}$=554 nm, $\epsilon$=62 530 l·mol$^{-1}$·cm$^{-1}$.

EXAMPLE A46

The procedure of Example A3 is repeated but using, instead of rhodamine B, an equimolar amount of the compound of Example A40. The following compound is obtained:

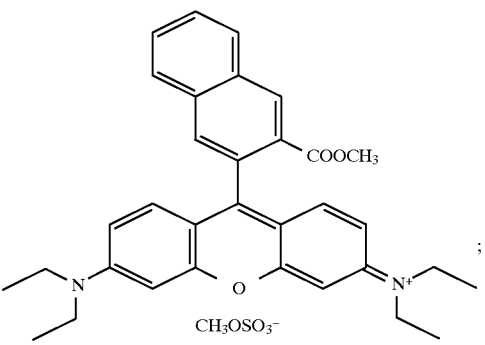

UV/VIS (ethanol): $\lambda_{max}$=555 nm, $\epsilon$=90 200 l·mol$^{-1}$·cm$^{-1}$.

EXAMPLE A47

The procedure of Example A4 is repeated but using, instead of dipropylamine, an equimolar amount of dimethylamine. The following compound is obtained:

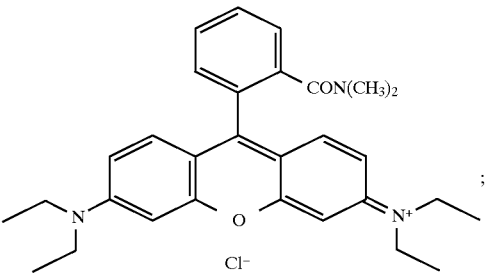

UV/VIS (ethanol): $\lambda_{max}$=561 nm, $\epsilon$=94 300 l·mol$^{-1}$·cm$^{-1}$.

EXAMPLE A48

The procedure of Example A4 is repeated but using, instead of dipropylamine, an equimolar amount of diethylamine. The following compound is obtained:

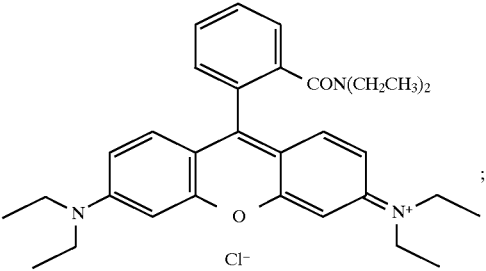

UV/VIS (ethanol): $\lambda_{max}$=561 nm, $\epsilon$=100 240 l·mol$^{-1}$·cm$^{-1}$.

EXAMPLE A49

The procedure of Example A4 is repeated but using, instead of dipropylamine, an equimolar amount of dibutylamine. The following compound is obtained:

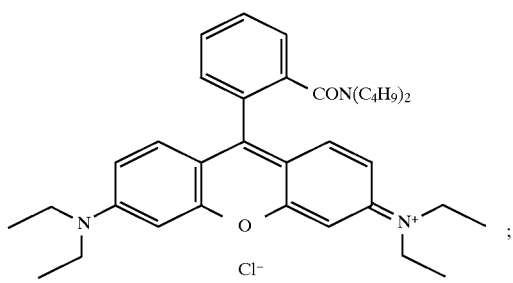

UV/VIS (ethanol): $\lambda_{max}$=563 nm, $\epsilon$=95 420 l·mol$^{-1}$·cm$^{-1}$.

EXAMPLE A50

The procedure of Example A4 is repeated but using, instead of dipropylamine, an equimolar amount of piperidine. The following compound is obtained:

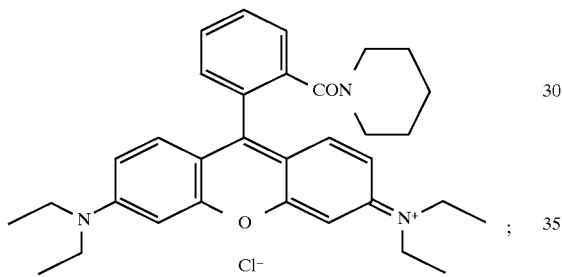

UV/VIS (ethanol): $\lambda_{max}$=561 nm, $\epsilon$=91 130 l·mol$^{-1}$·cm$^{-1}$.

EXAMPLE A51

The procedure of Example A17 is repeated but using, instead of the compound of Example A4, an equimolar amount of the compound of Example A2. The following compound is obtained:

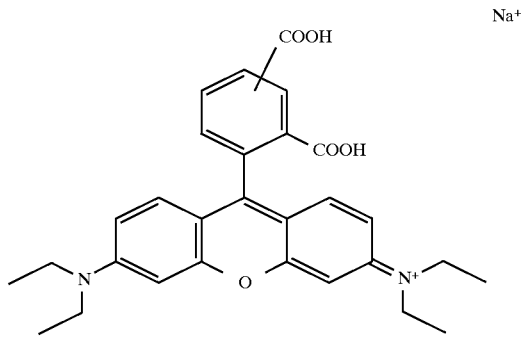

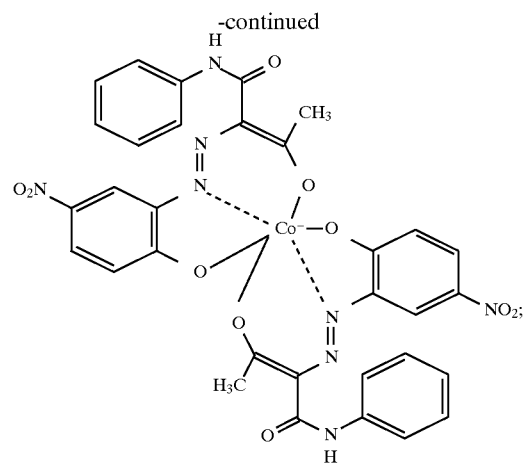

UV/VIS (ethanol): $\lambda_{max}$=542 nm, $\epsilon$=56 700 l·mol$^{-1}$·cm$^{-1}$.

EXAMPLE A52

The procedure of Example A17 is repeated but using, instead of the compound of Example A4, an equimolar amount of sulforhodamine 101 free acid. The following compound is obtained:

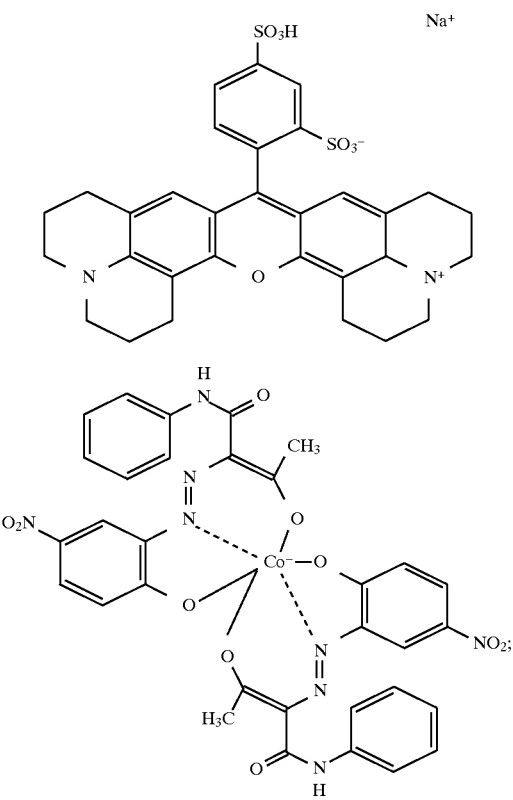

UV/VIS (ethanol): $\lambda_{max}$=575 nm, $\epsilon$=116 450 l·mol$^{-1}$·cm$^{-1}$.

EXAMPLE A53

The procedure of Example A52 is repeated but using 95% of the equimolar amount of sulforhodamine 101 free acid plus 5% of the equimolar amount of the dye prepared in accordance with Example 2 of EP 0 540 468 A1.

EXAMPLE A54

The procedure of Example A5 is repeated but using, instead of 3-diethylaminophenol, an equimolar amount of 3-dibutylaminophenol. The following compound is obtained:

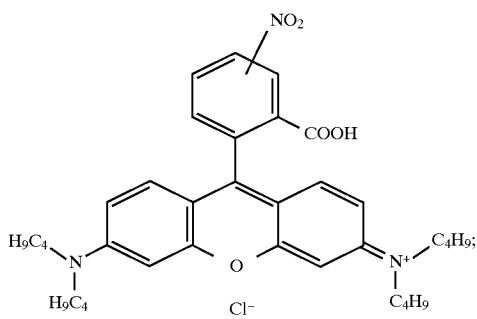

UV/VIS (ethanol): $\lambda_{max}$=557 nm, $\epsilon$=42 460 l·mol$^{-1}$·cm$^{-1}$.

EXAMPLE A55

The procedure of Example A6 is repeated but using, instead of the product of Example A5, an equimolar amount of the product of Example A54. The following compound is obtained:

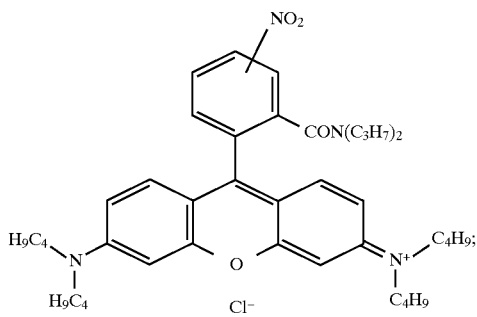

UV/VIS (ethanol): $\lambda_{max}$=576 nm, $\epsilon$=47 420 l·mol$^{-1}$·cm$^{-1}$.

EXAMPLES A56–A74

The procedure of Example A17 is repeated but using, instead of the compound of Example A4, in each case a compound from an example indicated in the table below. The subsequent procedure is then as in Example 18. The following compounds are obtained:

| Example | From starting material of example | Yield (% of theory) | $\lambda_{max}$ (ethanol) [nm] | $\epsilon$ (ethanol) [l · mol$^{-1}$ cm$^{-1}$] |
|---|---|---|---|---|
| A56 | A5 | 98.9 | 553 | 62 280 |
| A57 | A 7 | 84.1 | 551 | 85 690 |
| A58 | A8 | 85.6 | 562 | 96 400 |
| A59 | A9 | 83.5 | 575 | 55 540 |
| A60 | A10 | 94.0 | 577 | 41 500 |
| A61 | A11 | 88.7 | 585 | 64 650 |
| A62 | A13 | 88.3 | 578 | 71 770 |
| A63 | A36 | 85.4 | 596 | 73 260 |
| A64 | A41 | 94.1 | 555 | 114 850 |
| A65 | A42 | 89.1 | 555 | 73 610 |
| A66 | A43 | 85.3 | 551 | 97 850 |
| A67 | A44 | 83.7 | 560 | 69 960 |
| A68 | A45 | 98.0 | 554 | 85 010 |
| A69 | A46 | 87.2 | 555 | 92 830 |
| A70 | A47 | 88.7 | 561 | 111 340 |
| A71 | A48 | 82.9 | 561 | 114 760 |
| A72 | A49 | 68.2 | 563 | 102 830 |
| A73 | A50 | 88.6 | 561 | 97 240 |
| A74 | A55 | 91.0 | 575 | 54 320 |

EXAMPLE B1

2% by weight of the product of Example A1 is dissolved in 2,2,3,3-tetrafluoro-1-propanol and the solution is filtered through a Teflon filter with a pore width of 0.2 µm and applied to the surface of a 1.2 mm-thick, grooved polycarbonate disc of diameter 120 mm via the spin coating technique at 1000 rpm. The excess solution is spun off by increasing the speed of rotation. When the solvent is evaporated the dye remains as a uniform, amorphous solid layer. After drying, the solid layer has an absorbance of 0.16 at 635 nm. In a vacuum coating apparatus a 100 nm-thick layer of aluminium is then applied to the recording layer. Subsequently, a 13 µm-thick protective layer of a UV-curable photopolymer (SD-17, Dainippon Ink) is applied to the aluminium layer by spin coating. The recording support has a base reflectivity of 67% at 635 nm. Using a 10 mW laser diode of wavelength 635 nm, an inscription is made into the active layer at an output of 8 mW. This operation brings about a change in reflection from 67% to 35% at inscribed sites. The marks are read out again at reduced output. The reflectivity shows a local change from high to low, and the signal-to-noise ratio is excellent.

EXAMPLE B2

1% by weight of sulforhodamine 101 free acid [C.A. Reg. No. 60311-02-6] is dissolved in 2,2,3,3-tetrafluoro-1-propanol, and the solution is filtered through a 0.2 µm Teflon filter and applied by spin coating as in Example B1 to the surface of a grooved polycarbonate disc. After evaporation of the solvent the dye remains as a uniform, amorphous solid layer. The storage layer prepared in this way has an absorbance of 0.58 at the absorption maximum of 604 nm. As in Example B1, a reflection layer and a protective layer are applied thereto. The recording support has a base reflectivity of 70% at 650 nm. A pulsed dye laser of wavelength 635 nm is used to write marks onto the abovementioned medium, at an output of 9 mW and a pulse duration of 15 ns. Under the microscope, the marks appear circular and dark.

EXAMPLE B3

2.0% by weight of the product prepared as in Example A33, of the formula

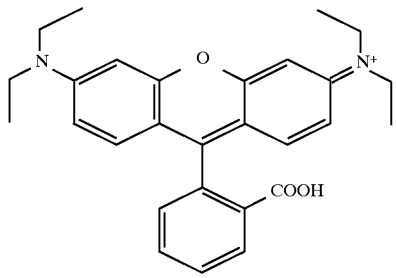

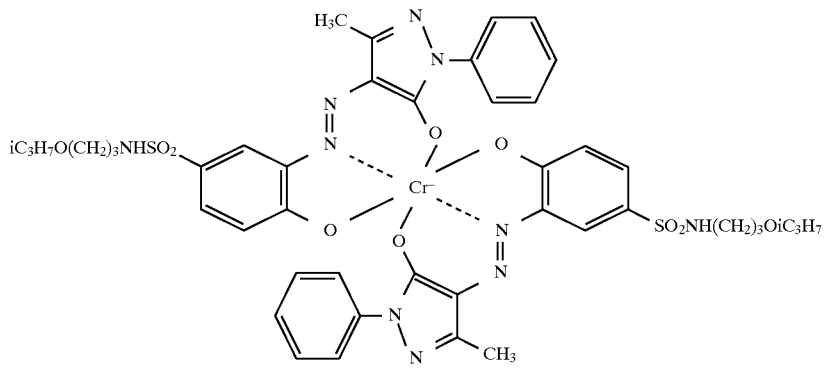

is dissolved in methoxyethanol and the solution is filtered and applied to a polycarbonate substrate as in Example B1 by spin coating at 200 rpm, the excess being spun off at 800 rpm. After drying, the solid layer has an absorbance of 0.7 at 566 nm. Then a reflection layer and a protective polymer layer are applied as in Example B1. Laser energy of 15 nJ/pixel at a linear rate of 1 m/s at the write wavelength of 635 nm is used to write marks in the active layer. The marks obtained in this way exhibit high contrast.

EXAMPLE B4

The procedure of Example B3 is repeated but replacing the dye by Colour Index Solvent Red 127. The solid layer has an absorbance of 0.8 at 569 nm. Subsequently, a reflection layer and a protective polymer layer are applied as in Example B1. Using a laser output of 5 mW, marks are written at a linear rate of 0.5 m/s at 635 nm.

EXAMPLE B5

The procedure of Example B4 is repeated but replacing the dye by the product of Example A53. The reflectivity measured with a microscopic spectrophotometer (UMSP 80, Zeiss) is 62%. A laser output of 6 mW is used to inscribe marks at a linear rate of 0.5 m/s at 635 nm. The reflectivity at written sites is 25%.

EXAMPLES B6–B49

The products of Examples A14–A35, A51–A53 and A56–A74 are coated, inscribed and read on polycarbonate discs, as in Example B1. The results are very good.

EXAMPLES B50–B78

The products of Examples A2–A13, A36–A50 and A54–A55 are coated, inscribed and read on polycarbonate discs, as in Example B1. The results are good.

EXAMPLE C1

A solid layer of the product of Example A69 is applied to a glass support and measured by a spectral ellipsometric method (Sopra Instrument). At the recording wavelength of 635 nm a refractive index of n=2.15 and an absorption coefficient of k=0.01 are found.

EXAMPLE C2

An exposure apparatus (Cl35, Atlas) is used to test the light stability of a solid layer according to Example B3 at a radiation output of 80 klux. The optical density at the absorption maximum after 40 hours is still 80% of the original value.

We claim:

1. An optical recording medium comprising a substrate, a reflecting layer and a recording layer, wherein this recording layer consists essentially of one or more dyes of the formula (I)

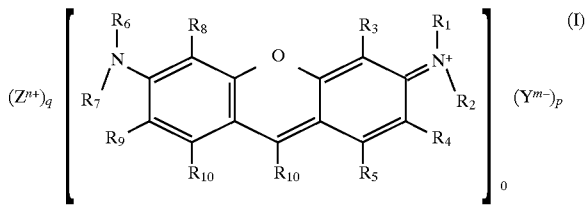

in which $R_1$, $R_2$, $R_6$ and $R_7$ independently of one another are hydrogen, unsubstituted or mono- or poly-halo-, —$C_1$–$C_8$alkoxy-, —$C_1$–$C_8$alkylthio-, —$NO_2$—, —CN—, —$NR_{12}R_{13}$—, —COO$^-$—, —COOH, —COO— $C_1$–$C_8$alkyl-, $SO_3^-$—, —$SO_3$H— or —$SO_3$—$C_1$–$C_8$alkyl- substituted $C_1$–$C_{20}$alkyl, $C_2$–$C_{20}$alkenyl or $C_2$–$C_{20}$alkynyl or unsubstituted or mono- or poly-$C_1$–$C_8$alkyl-, —$C_1$–$C_8$alkoxy-, —$C_1$–$C_8$alkylthio-, -halo-, —$NO_2$—, —CN—, —$NR_{12}R_{13}$—, $SO_3^-$—, —$SO_3R_{12}$—, —$SO_2NR_{12}R_{13}$—, —COO$^-$—, —COOR$_{12}$—, —CONR$_{12}R_{13}$—, —PO$_3^-$—, —PO(OR$_{12}$)(OR$_{13}$)— or —SiR$_{14}R_{15}R_{16}$-substituted $C_7$–$C_{18}$aralkyl or $C_6$–$C_{14}$aryl, wherein $R_1$ and $R_6$ and $R_2$ and $R_7$ are not each both simultaneously hydrogen, and where $R_1$ and $R_2$ and $R_6$ and $R_7$ independently of one another, each in pairs, are separate or, if they contain substitutable sites, can be connected to one another in such a way, via a direct bond or via a bridge —O— or —$NR_{12}$—, as to form with the shared $N^+$ a five- or six-membered heterocycle;

$R_3$, $R_4$, $R_5$, $R_8$, $R_9$ and $R_{10}$ independently of one another are hydrogen, halogen, $OR_{17}$, $SR_{17}$, $NO_2$, $NR_{18}R_{19}$ or unsubstituted or mono- or poly-halo-, —$C_1$–$C_8$alkoxy-, —$C_1$–$C_8$alkylthio-, —$NO_2$—, —CN— or —$NR_{18}R_{19}$-substituted $C_1$–$C_{20}$alkyl, $C_2$–$C_{20}$alkenyl, $C_2$–$C_{20}$alkynyl or $C_7$–$C_{18}$aralkyl, $R_1$ and $R_3$, $R_2$ and $R_4$, $R_6$ and $R_8$ and $R_7$ and $R_9$ independently of one another, each in pairs, are separate or, if both in each case contain at least one substitutable site, are connected to one another in such a way, via a direct bond or via a bridge —O— or —$NR_{20}$—, as to form a five- or six-membered heterocycle with the shared group C—C=$N^+$, C=C—N or C—C—N, or $R_4$ and $R_5$ or independently thereof, $R_9$ and $R_{10}$ together are 1,4-buta-1,3-dienylene which is unsubstituted or is substituted one or more times by $C_1$–$C_8$alkyl, $C_1$–$C_8$alkoxy, $C_1$–$C_8$alkylthio, halogen, $NO_2$, CN, $NR_{18}R_{19}$, $SO_3^-$, $SO_3R_{17}$, $SO_2NR_{18}R_{19}$, $COO^-$, $COOR_{17}$, $CONR_{18}R_{19}$, $PO_3^-$, $PO(OR_{18})(OR_{19})$ or $SiR_{21}R_{22}R_{23}$, so that alone or together with the shared C=C group a six-membered aromatic ring is formed;

$R_{11}$ is hydrogen, $(CH_2)_kCOO^-$, $(CH_2)_kCOOR_{24}$, $C_1$–$C_{20}$alkyl, $C_2$–$C_{20}$alkenyl, $C_2$–$C_{20}$alkynyl or $C_6$–$C_{14}$aryl or $C_7$–$C_{18}$aralkyl which is unsubstituted or substituted one or more times by halogen, $NO_2$, CN, $NR_{24}R_{25}$, $SO_3^-$, $SO_3R_{24}$, $SO_2NR_{24}R_{25}$, $COO^-$, $(CH_2)_k OR_{24}$, $(CH_2)_k OCOR_{24}$, $COOR_{24}$, $CONR_{24}R_{25}$, $OR_{24}$, $SR_{24}$, $PO_3^-$, $PO(OR_{24})(OR_{25})$ or $SiR_{21}R_{22}R_{23}$;

$R_{12}$, $R_{13}$, $R_{17}$, $R_{18}$, $R_{19}$, $R_{20}$, $R_{24}$ and $R_{25}$ independently of one another are hydrogen, $C_1$–$C_{20}$alkyl, $C_2$–$C_{20}$alkenyl, $C_2$–$C_{20}$alkynyl or $C_7$–$C_{18}$aralkyl, or are $C_6$–$C_{14}$aryl which is unsubstituted or substituted one or more times by $C_1$–$C_8$alkyl, $C_1$–$C_8$alkoxy, $C_1$–$C_8$alkylthio, halogen, $NO_2$, CN, $NH_2$, $NHR_{21}$, $NR_{21}R_{22}$, $SO_3^-$, $SO_3R_{23}$, $SO_2NH_2$, $SO_2NHR_{21}$, $SO_2NR_{21}R_{22}$, $COO^-$, $COOR_{23}$, $CONH_2$, $CONHR_{21}$, $CONR_{21}R_{22}$, $PO_3^-$, $PO(OR_{21})(OR_{22})$ or $SiR_{14}R_{15}R_{16}$, or $NR_{12}R_{13}$, $NR_{18}R_{19}$, $NR_{21}R_{22}$ or $NR_{24}R_{25}$ is a five- or six-membered heterocycle which can contain an additional N or O atom and which can be substituted one or more times by $C_1$–$C_8$alkyl;

$R_{14}$, $R_{15}$, $R_{16}$, $R_{21}$, $R_{22}$ and $R_{23}$ independently of one another are $C_1$–$C_{20}$alkyl, $C_2$–$C_{20}$alkenyl, $C_2$–$C_{20}$alkynyl, or $C_7$–$C_{18}$aralkyl;

Y is the anion of an inorganic, organic or organometallic acid, or a mixture thereof, with the proviso that Y is not a compound of formula,

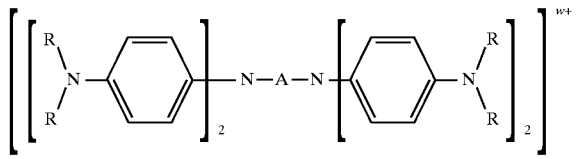

wherein R is hydrogen or a lower alkyl group, A is,

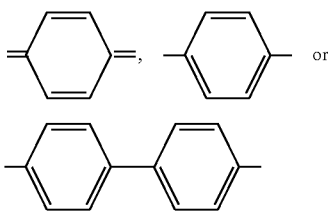

and w is 1 or 2;

Z is a proton or a metal cation, ammonium cation or phosphonium cation, or a mixture thereof;

k is an integer from 1 to 10;

m, n and o independently of one another are each an integer from 1 to 3; and p and q are each an integer from 0 to 4, where the relationship between o, p and q, depending on the charge of the associated substructures, is such that there is no excess positive or negative charge in formula (I).

2. A recording medium according to claim 1, in which $R_1$, $R_2$, $R_6$ and $R_7$ independently of one another are hydrogen or are unsubstituted or mono- or poly-$COO^-$—, —COOH—, —COO—$C_1$–$C_8$alkyl-, —$SO_3^-$, —$SO_3H$— or —$SO_3$—$C_1$–$C_8$alkyl-substituted $C_1$–$C_{20}$alkyl, $C_2$–$C_{20}$alkenyl or $C_2$–$C_{20}$alkynyl, but $R_1$ and $R_6$ and $R_2$ and $R_7$ are not in each case both simultaneously hydrogen;

and $R_1$ and $R_2$ and $R_6$ and $R_7$ independently of one another, each in pairs, are separate or, if they contain substitutable sites, can be connected to one another in such a way, via a direct bond or via a bridge —O— or —$NR_{12}$—, as to form with the shared $N^+$ a five- or six-membered heterocycle;

$R_3$ and $R_8$ independently of one another are hydrogen, halogen, $OR_{17}$, $NO_2$, $C_1$–$C_{20}$alkyl, $C_2$–$C_{20}$alkenyl, $C_2$–$C_{20}$alkynyl or $C_7$–$C_{18}$aralkyl;

$R_4$, $R_5$, $R_9$ and $R_{10}$ independently of one another are hydrogen, halogen, $NO_2$, $OR_{17}$ or unsubstituted $C_1$–$C_{20}$alkyl, $C_2$–$C_{20}$alkenyl, $C_2$–$C_{20}$alkynyl or $C_7$–$C_{18}$aralkyl;

and $R_1$ and $R_3$, $R_2$ and $R_4$, $R_6$ and $R_8$ and $R_7$ and $R_9$ independently of one another, each in pairs, are separate or, if both in each case contain at least one substitutable site, are connected to one another in such way, via a direct bond, as to form a five- or six-membered heterocycle with the shared group C—C=$N^+$, C=C—N or C—C—N;

$R_{11}$ is hydrogen, $(CH_2)_kCOO^-$ or $(CH_2)_kCOOR_{24}$ or is naphthyl or phenyl which is unsubstituted or substituted one or more times by halogen, $NO_2$, $NR_{24}R_{25}$, $SO_3^-$, $SO_3R_{24}$, $SO_2NR_{24}R_{25}$, $(CH_2)_k OR_{24}$, $COO^-$, $COOR_{24}$, $CONR_{24}R_{25}$ or $OR_{24}$;

$R_{17}$, $R_{19}$, $R_{24}$ and $R_{25}$ independently of one another are hydrogen or unsubstituted $C_1$–$C_{20}$alkyl, $C_2$–$C_{20}$alkenyl, $C_2$–$C_{20}$alkynyl or $C_7$–$C_{18}$aralkyl; and o is an integer 1 or 2.

3. A recording medium according to claim 2, wherein $R_1$, $R_2$, $R_6$ and $R_7$ independently of one another are unsubstituted $C_1$–$C_{20}$alkyl, $R_1$ and $R_2$ and $R_6$ and $R_7$ independently of one another, each in pairs, are separate, or can be connected to one another in such a way, via a direct bond or via a bridge —O— or —$NR_{12}$—, as to form with the shared $N^+$ a five- or six-membered heterocycle;

$R_3$, $R_4$, $R_8$ and $R_9$ independently of one another are hydrogen or unsubstituted $C_1$–$C_{20}$alkyl, $R_1$ and $R_3$, $R_2$ and $R_4$, $R_6$ and $R_8$ and $R_7$ and $R_9$ independently of one another, each in pairs, are separate, or are connected to one another in such a way, via a direct bond, as to form a five- or six-membered heterocycle with the shared group C—C=N$^+$, C=C—N or C—C—N;

$R_5$ and $R_{10}$ are hydrogen;

$R_{11}$ is naphthyl or phenyl which is unsubstituted or substituted one or more times by halogen, $NO_2$, $SO_3^-$, $SO_3R_{24}$, $SO_2NR_{24}R_{25}$, $COO^-$, $COOR_{24}$ or $CONR_{24}R_{25}$;

$R_{12}$ is hydrogen or unsubstituted $C_1$–$C_4$alkyl; and $R_{24}$ and $R_{25}$ independently of one another are hydrogen or unsubstituted $C_1$–$C_{20}$alkyl.

4. A recording medium according to claim 1, wherein $Y^{m-}$ is a transition metal complex anion containing at least one phenolic or phenylcarboxylic azo compound as ligand, m is an integer 1 or 2, and p is a number from 0 to 2.

5. A recording medium according to claim 1, wherein Z is a proton or a metal cation or ammonium cation, n is an integer 1 or 2, and q is a number from 0 to 3.

6. A recording medium according to claim 4, wherein $Y^{m-}$ is a transition metal complex anion of the formula (II),

(II)

in which $L_1$ and $L_2$ independently of one another are ligands of the formulae

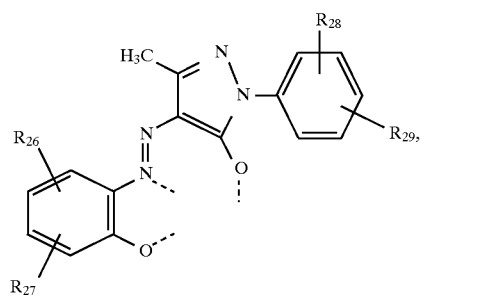

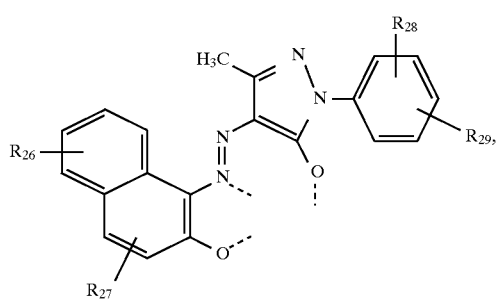

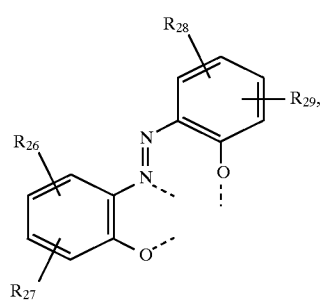

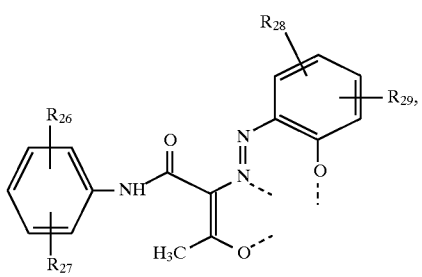

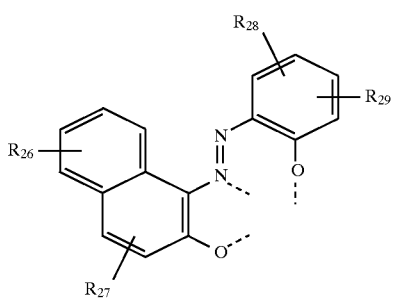

or

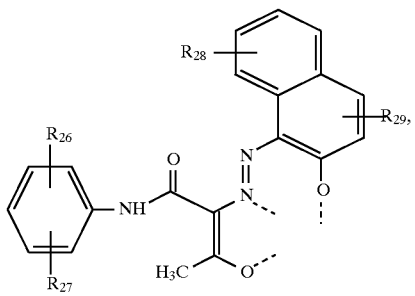

in which $R_{26}$, $R_{27}$, $R_{28}$ and $R_{29}$ independently of one another are hydrogen, halogen, $R_{30}$, $NO_2$, $NR_{30}R_{31}$, NHCO—$R_{30}$, NHCOO—$R_{30}$, $SO_2$—$R_{30}$, $SO_2NH_2$, $SO_2NH$—$R_{30}$, $SO_2NR_{30}R_{31}$, $SO_3^-$ or $SO_3H$, where $R_{30}$ and $R_{31}$ independently of one another are unsubstituted or hydroxyl-, halo- or $C_1$–$C_6$alkoxy-substituted $C_1$–$C_{12}$alkyl; and M is $Cr^{3+}$ or $Co^{3+}$.

7. A recording medium according to claim 1, wherein $Z^{n+}$ is $[NH_2R_{32}R_{33}]^+$, where $R_{32}$ is hydrogen or $C_1$–$C_{12}$alkyl and $R_{33}$ is $C_1$–$C_{24}$alkyl or $C_7$–$C_{24}$aralkyl, and $R_{32}$ and $R_{33}$ together have from 8 to 25 carbon atoms.

8. A recording medium according to claim 1, wherein m, n and o are each the number 1, p is a number from 0 to 2½, and q is a number from 0 to 1½, the sum of o and q being identical to p, so that in formula (II) no excess positive or negative charge results.

9. A recording medium according to claim 1, wherein formula (I) is

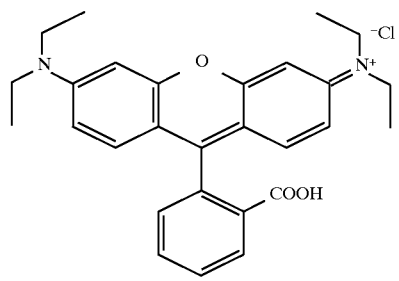
(rhodamine B),
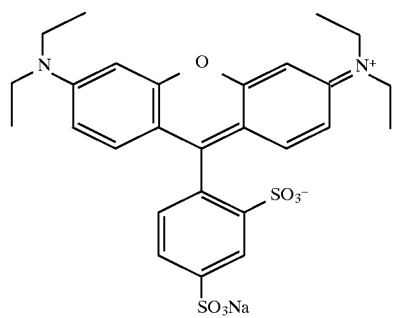
(sulfothodamine B monosodium salt),
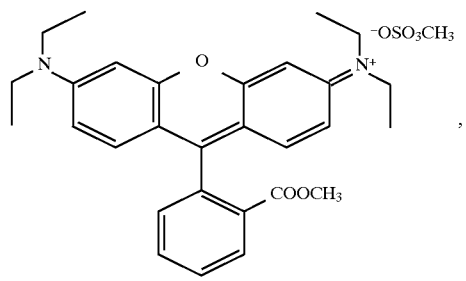
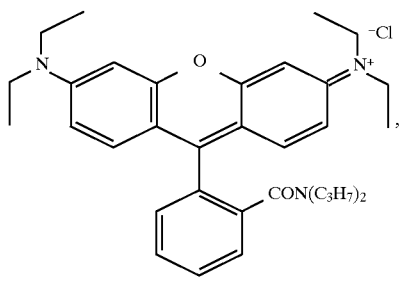
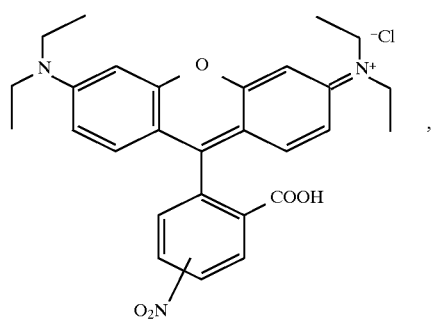
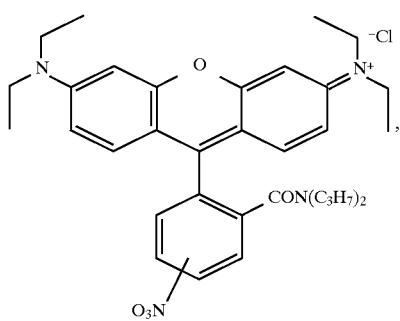
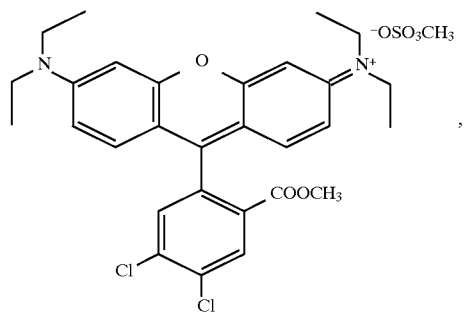
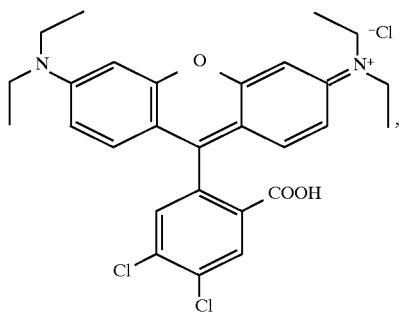

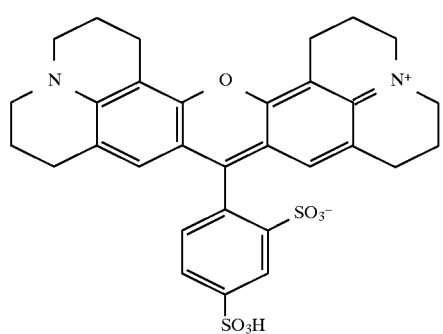
(sulforhodamine 101 free acid),
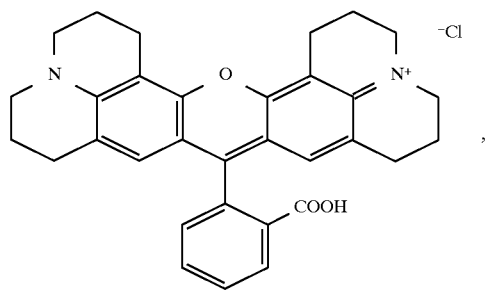
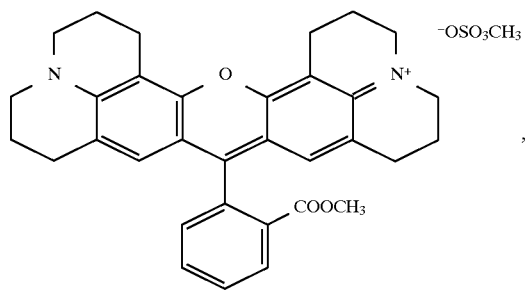
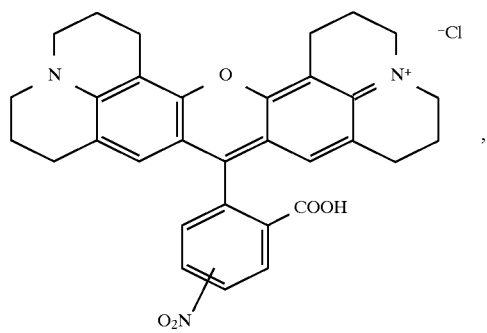
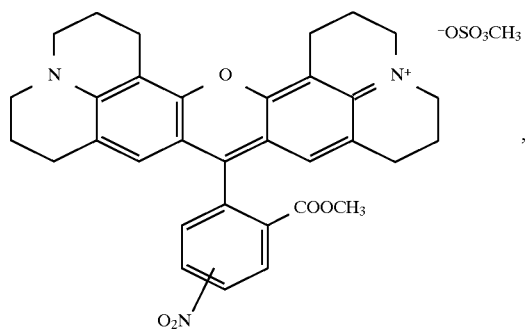
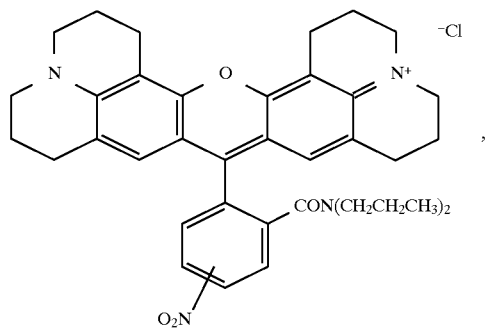
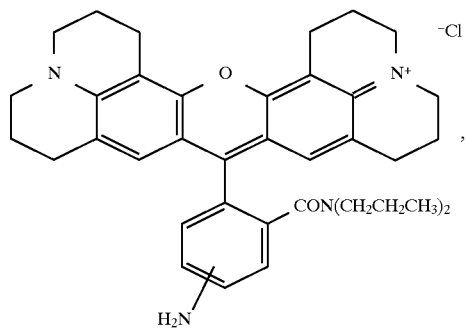
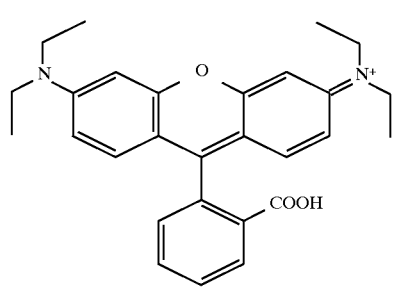
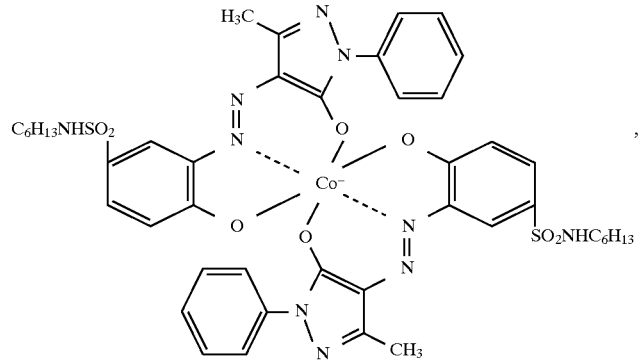

-continued
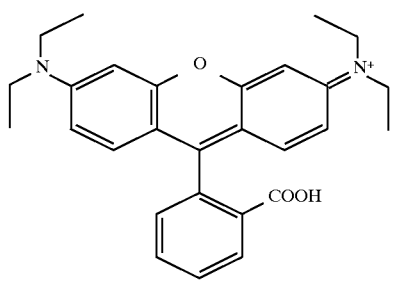
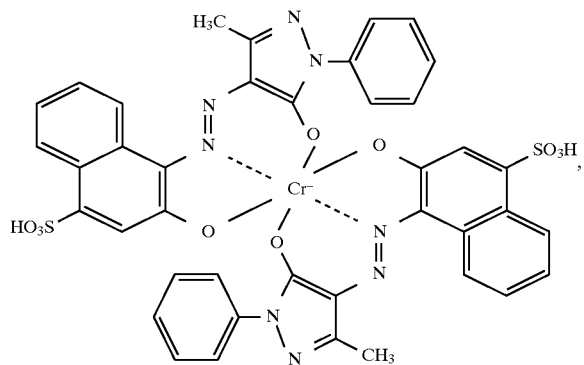
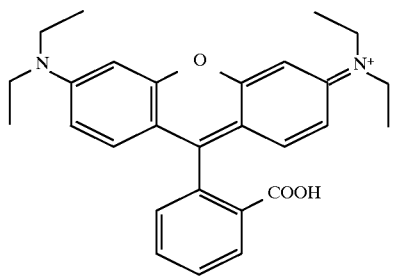
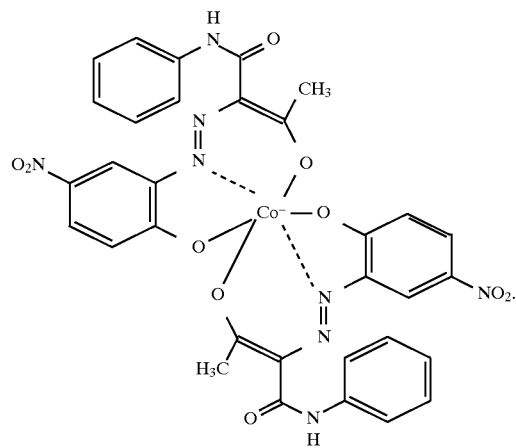
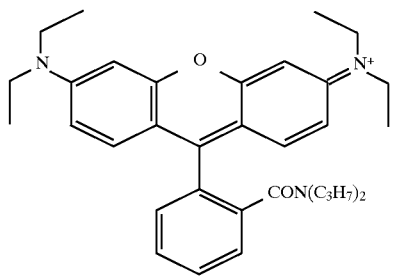
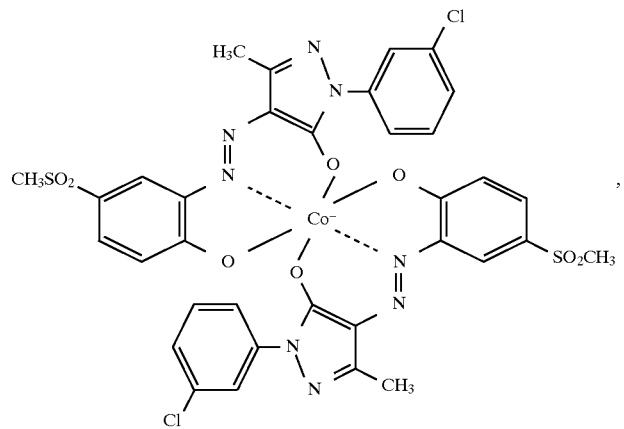
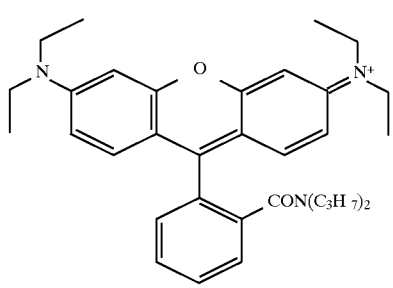
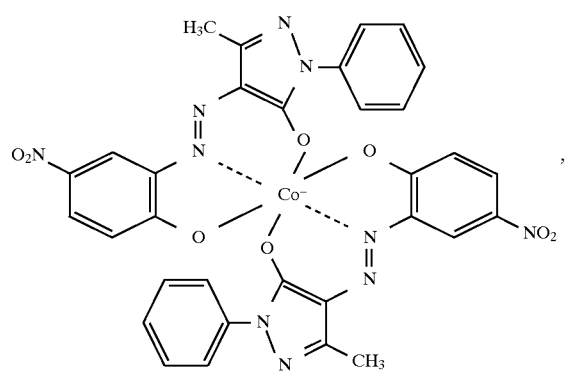

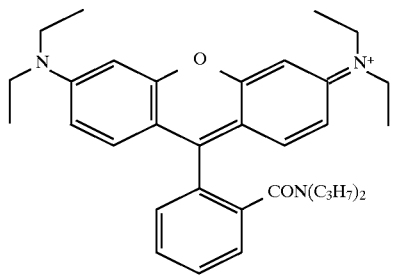
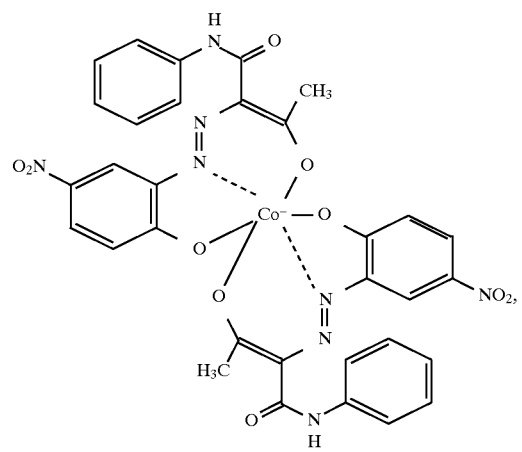
-continued
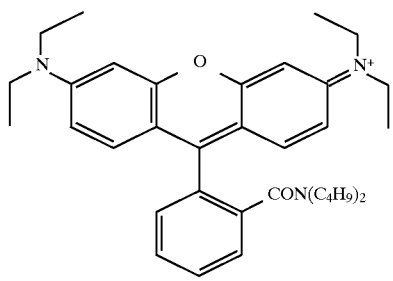
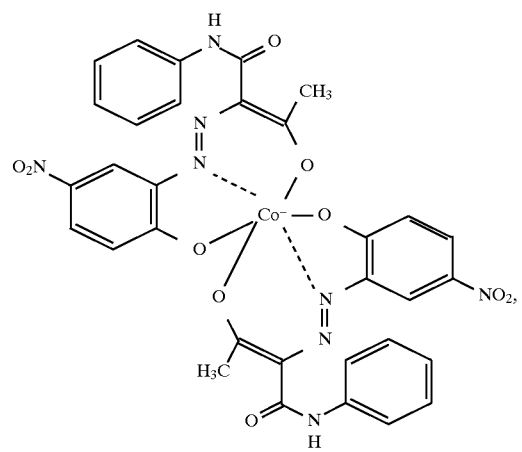
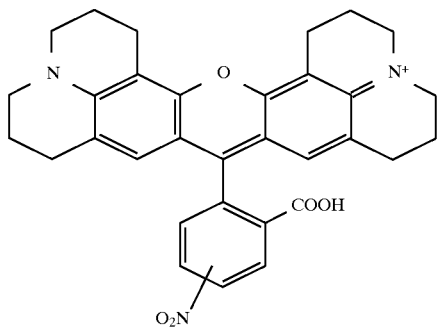
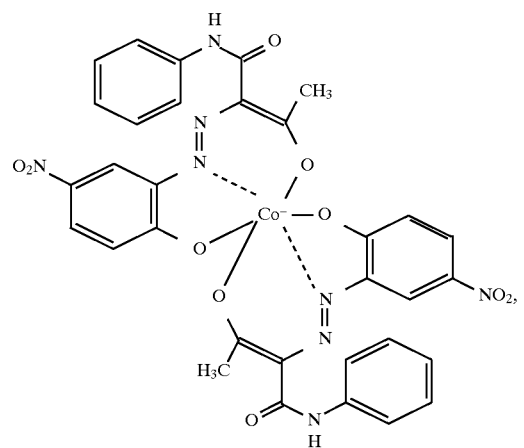

-continued

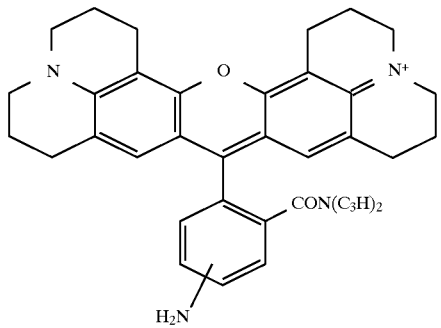

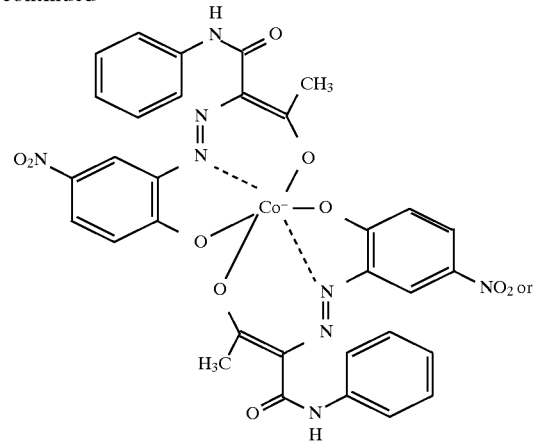

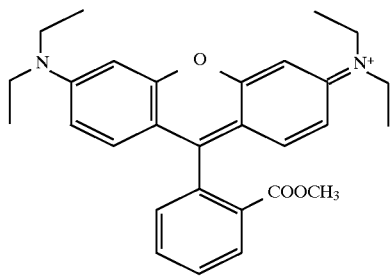

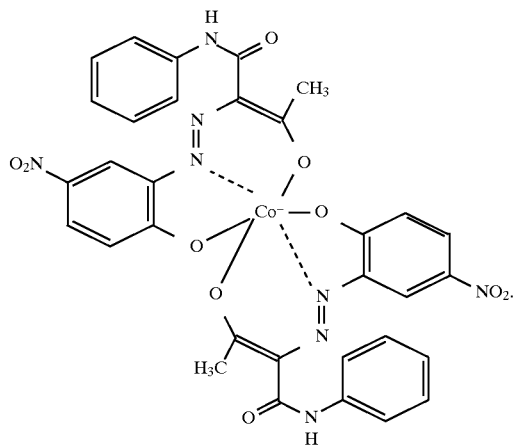

10. A recording medium according to claim 1, wherein the dye of the formula (I) has an absorption maximum at from 540 to 610 nm in ethanolic solution and a refractive index of from 2.0 to 3.0 in the range from 600 to 700 nm.

11. A recording medium according to claim 1, wherein the substrate has a transparency of at least 90% and a thickness of from 0.01 to 10 mm.

12. A recording medium according to claim 11, wherein the substrate has a thickness of from 0.1 to 5 mm.

13. A recording medium according to claim 1, wherein the reflecting layer consists of aluminium, silver, copper, gold or alloys thereof and has a reflectivity of at least 70% and a thickness of from 10 to 150 nm.

14. A recording medium according to claim 1, wherein the recording layer is located between the transparent substrate and the reflecting layer and has a thickness of from 10 to 1000 nm.

15. A recording medium according to claim 14, wherein the recording layer has a thickness of from 80 to 150 nm.

16. A recording medium according to claim 1, whose topmost layer is provided with an additional protective layer whose thickness is from 0.1 to 1000 μm.

17. A recording medium according to claim 16, wherein a second substrate layer is also arranged above the additional protective layer.

18. A recording medium according to claim 17, wherein the second substrate layer is from 0.1 to 5 mm thick and consists of the same material as the support substrate.

19. A recording medium according to claim 16, wherein the protective layer has a thickness of from 0.5 to 15 μm.

20. A recording medium according to claim 1 which has a reflectivity of at least 60%.

21. A recording medium according to claim 1, in which between the recording layer and the reflecting layer and/or between the recording layer and the substrate there is additionally arranged at least one interference layer consisting of a dielectric material.

22. A method of optical recording, storage and reproduction of information, wherein a recording medium according to claim 1 is used.

23. A method according to claim 22, wherein recording and reproduction take place in the wavelength range from 600 to 700 nm.

* * * * *

UNITED STATES PATENT AND TRADEMARK OFFICE
CERTIFICATE OF CORRECTION

PATENT NO.   : 5,851,621
DATED        : December 22, 1998
INVENTOR(S)  : Heinz Wolleb et al.

It is certified that error appears in the above-identified patent and that said Letters Patent is hereby corrected as shown below:

Title page,
Item [57], ABSTRACT, Formula (I) should read:

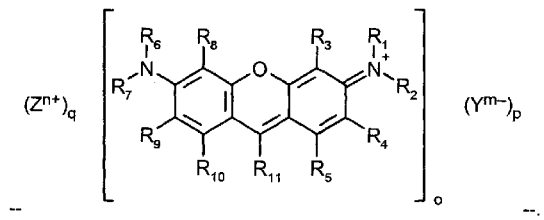

Column 2,
Lines 20-25, Formula (I) should read:

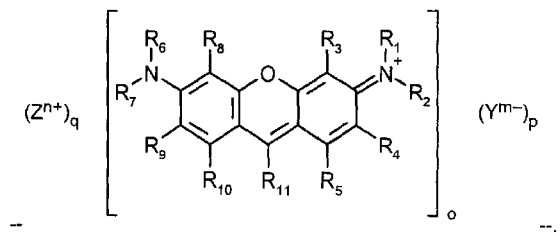

UNITED STATES PATENT AND TRADEMARK OFFICE
CERTIFICATE OF CORRECTION

PATENT NO.    : 5,851,621
DATED         : December 22, 1998
INVENTOR(S)   : Heinz Wolleb et al.

It is certified that error appears in the above-identified patent and that said Letters Patent is hereby corrected as shown below:

Column 54,
Lines 50-55, Formula (I) in claim 1 should read:

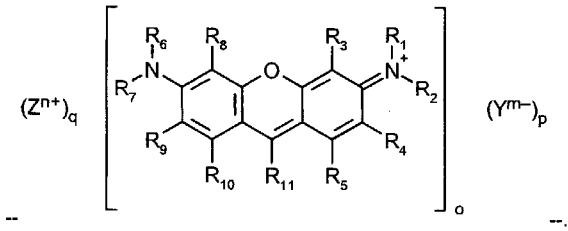

Signed and Sealed this

First Day of July, 2003

JAMES E. ROGAN
*Director of the United States Patent and Trademark Office*